United States Patent
Bufano et al.

(10) Patent No.: US 11,777,128 B1
(45) Date of Patent: Oct. 3, 2023

(54) FLOW BATTERY WITH A DYNAMIC FLUIDIC NETWORK

(71) Applicant: Lockheed Martin Energy, LLC, Bethesda, MD (US)

(72) Inventors: Michael Bufano, Belmont, MA (US); Jeremy S. Loretz, Palo Alto, CA (US); Jonathan Hamel, Sudbury, MA (US); Kean L. Duffey, Arlington, VA (US); Adam Morris-Cohen, Concord, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 0 days.

(21) Appl. No.: 17/810,462

(22) Filed: Jul. 1, 2022

Related U.S. Application Data

(63) Continuation of application No. PCT/US2022/072206, filed on May 9, 2022.

(51) Int. Cl.
  *H01M 8/04276* (2016.01)
  *H01M 8/18* (2006.01)

(52) U.S. Cl.
  CPC ....... *H01M 8/188* (2013.01); *H01M 8/04276* (2013.01)

(58) Field of Classification Search
  CPC .................. H01M 8/188; H01M 8/04276
  See application file for complete search history.

(56) References Cited

U.S. PATENT DOCUMENTS

| | | |
|---|---|---|
| 3,779,813 A | 12/1973 | Rabut |
| 4,539,086 A | 9/1985 | Fujita et al. |
| 4,560,453 A | 12/1985 | Hoffman et al. |
| 4,902,589 A | 2/1990 | Dahn et al. |
| 4,948,681 A | 8/1990 | Zagrodnik et al. |
| 5,026,465 A | 6/1991 | Katz et al. |
| 5,128,016 A | 7/1992 | Moment et al. |
| 5,618,641 A | 4/1997 | Arias |
| 5,641,586 A | 6/1997 | Wilson |
| 5,665,212 A | 9/1997 | Zhong et al. |
| 5,766,787 A | 6/1998 | Watanabe et al. |
| 5,879,826 A | 3/1999 | Lehman et al. |
| 5,942,102 A | 8/1999 | Hodges et al. |
| 6,156,451 A | 12/2000 | Bannerjee et al. |
| 6,296,746 B1 | 10/2001 | Broman et al. |
| 6,368,488 B1 | 4/2002 | Scherson |
| 6,413,410 B1 | 7/2002 | Hodges et al. |
| 6,426,161 B1 | 7/2002 | Cisar et al. |
| 6,497,973 B1 | 12/2002 | Amendola |
| 6,509,119 B1 | 1/2003 | Kobayashi et al. |
| 7,179,561 B2 | 2/2007 | Niu et al. |
| 8,394,529 B2 | 3/2013 | Keshavarz et al. |
| 8,637,192 B2 | 1/2014 | Yamamoto et al. |
| 8,986,892 B2 | 3/2015 | Yoon et al. |
| 9,166,243 B2 | 10/2015 | Perry |
| 9,559,374 B2 | 1/2017 | Esswein et al. |
| 2001/0017188 A1 | 8/2001 | Cooley et al. |
| 2003/0082425 A1 | 5/2003 | Leban |
| 2003/0087156 A1 | 5/2003 | Broman et al. |
| 2003/0194597 A1 | 10/2003 | Ganski et al. |
| 2004/0233616 A1 | 11/2004 | Arai et al. |
| 2004/0241525 A1 | 12/2004 | Mekala et al. |
| 2005/0098435 A1 | 5/2005 | Jacobson et al. |
| 2005/0136317 A1 | 6/2005 | Ferguson |
| 2005/0260473 A1 | 11/2005 | Wang |
| 2006/0068265 A1 | 3/2006 | Hanlon et al. |
| 2006/0099481 A1 | 5/2006 | Ji et al. |
| 2007/0072067 A1 | 3/2007 | Symons et al. |
| 2008/0060196 A1 | 3/2008 | Wang et al. |
| 2008/0193828 A1 | 8/2008 | Sahu |
| 2008/0291027 A1 | 11/2008 | Lake |
| 2008/0292938 A1 | 11/2008 | Perry et al. |
| 2008/0292964 A1 | 11/2008 | Kazacos et al. |
| 2008/0305385 A1 | 12/2008 | Smiljanich et al. |
| 2008/0318110 A1 | 12/2008 | Budinski et al. |

(Continued)

FOREIGN PATENT DOCUMENTS

| | | |
|---|---|---|
| CA | 2236848 | 5/1997 |
| CA | 2823963 | 7/2012 |

(Continued)

OTHER PUBLICATIONS

T. Xu: "Development of bipolar membrane-based processes", DESALINATION, vol. 140, No. 3, Nov. 20, 2001 (Nov. 20, 2001), pp. 247-258, XP004329758, ISSN: 0011-9164, DOI: 10.1016/S0011-9164(01)00374-5.

Annemiek Ter Heijne et al..: "A Bipolar Membrane Combined with Ferric Iron Reduction as an Efficient Cathode System in Microbial Fuel Cells", Environmental Science & Techno, American Chemical Society, US, vol. 40, No. 17, Jan. 1, 2006 (Jan. 1, 2006), pp. 5200-5205, XP007904193, ISSN: 0013-936X, DOI: 10.1021/ES0608545.

S.S. Hosseiny et al., "A polyelectrolyte membrane-based vanadium/air redox flow battery", Electrochemistry Communications 13 (2011), pp. 751-754, Nov. 26, 2010 <DOI: doi: 10.1016/j.elecom 2010.11.025>.

A. Stassi et al., "Performance comparison of long and short side chain perfluorosulfonic acid membranes for high temperature polymer electrolyte membrane fuel cell operation," Journal of Power Sources, 196 (2011), pp. 8925-8930.

(Continued)

*Primary Examiner* — Muhammad S Siddiquee
(74) *Attorney, Agent, or Firm* — Finnegan, Henderson, Farabow, Garrett & Dunner LLP

(57) ABSTRACT

Provided are flow batteries that include a fluidic train within a dynamic fluidic network system which fluidic train is convertible between a first state and a second state, the first state the first state placing a main electrolyte source and a dynamic fluidic network, outside the fluidic train and an electrode region, into fluid communication with the electrode region and the second state placing the main electrolyte source and the dynamic fluidic network, outside the fluidic train and the electrode region, into fluid isolation from the electrode region and placing the electrode region into fluid communication with a sampling segment. Also provided are methods of operating flow batteries.

30 Claims, 12 Drawing Sheets

(56) References Cited

U.S. PATENT DOCUMENTS

| | | |
|---|---|---|
| 2009/0026094 A1 | 1/2009 | Deng et al. |
| 2010/0047650 A1 | 2/2010 | Iino et al. |
| 2010/0047671 A1 | 2/2010 | Chiang et al. |
| 2010/0084288 A1 | 4/2010 | Hodges et al. |
| 2010/0159294 A1 | 6/2010 | Fly et al. |
| 2010/0260923 A1 | 10/2010 | Pursley |
| 2011/0048962 A1 | 3/2011 | Reece et al. |
| 2011/0048969 A1 | 3/2011 | Lawrence et al. |
| 2011/0223450 A1 | 9/2011 | Horne et al. |
| 2012/0122130 A1 | 5/2012 | Omura et al. |
| 2012/0164499 A1 | 6/2012 | Chiang et al. |
| 2012/0308911 A1 | 12/2012 | Peled et al. |
| 2012/0328910 A1 | 12/2012 | la O' et al. |
| 2013/0011702 A1 | 1/2013 | Horne et al. |
| 2013/0011704 A1 | 1/2013 | Horne et al. |
| 2013/0037760 A1 | 2/2013 | Maeda et al. |
| 2013/0071714 A1 | 3/2013 | Perry et al. |
| 2013/0084482 A1* | 4/2013 | Chang .............. H01M 8/0693 429/107 |
| 2013/0084506 A1 | 4/2013 | Chang et al. |
| 2013/0095361 A1 | 4/2013 | Sinsabaugh et al. |
| 2013/0149573 A1 | 6/2013 | Krupadanam et al. |
| 2013/0157097 A1 | 6/2013 | Kampanatsanyakorn et al. |
| 2013/0224538 A1 | 8/2013 | Jansen et al. |
| 2013/0316199 A1* | 11/2013 | Keshavarz .............. H01M 8/20 429/105 |
| 2014/0004402 A1 | 1/2014 | Yan et al. |
| 2014/0028260 A1 | 1/2014 | Goeltz et al. |
| 2014/0030573 A1 | 1/2014 | Esswein et al. |
| 2014/0051007 A1 | 2/2014 | Blanchet et al. |
| 2014/0057141 A1 | 2/2014 | Mosso et al. |
| 2014/0093804 A1 | 4/2014 | Kreiner et al. |
| 2014/0093812 A1 | 4/2014 | Madden et al. |
| 2014/0170511 A1 | 6/2014 | Tomalchev |
| 2014/0220450 A1 | 8/2014 | Jilek et al. |
| 2014/0227574 A1 | 8/2014 | Savinell et al. |
| 2014/0272483 A1 | 9/2014 | Pham et al. |
| 2014/0349147 A1 | 11/2014 | Shaffer, II et al. |
| 2015/0017494 A1 | 1/2015 | Amstutz et al. |
| 2015/0086896 A1* | 3/2015 | Chang .............. H01M 8/0482 324/432 |
| 2015/0136301 A1 | 5/2015 | Cyman, Jr. et al. |
| 2015/0194685 A1 | 7/2015 | Ballantine et al. |
| 2015/0210167 A1 | 7/2015 | Suekane et al. |
| 2015/0329384 A1 | 11/2015 | Astle |
| 2015/0380754 A1 | 12/2015 | Lee et al. |
| 2016/0049673 A1 | 2/2016 | Fukushima et al. |
| 2016/0133964 A1 | 5/2016 | Darling et al. |
| 2016/0141696 A1 | 5/2016 | Tago et al. |
| 2016/0164125 A1 | 6/2016 | Pijpers |
| 2016/0201206 A1 | 6/2016 | Biswal et al. |
| 2016/0211539 A1 | 7/2016 | Goeltz |
| 2016/0233531 A1* | 8/2016 | Reece .............. H01M 8/0693 |
| 2016/0240868 A1 | 8/2016 | Warrington et al. |
| 2016/0254562 A1 | 9/2016 | Morris-Cohen et al. |
| 2016/0293979 A1 | 10/2016 | King et al. |
| 2016/0293991 A1 | 10/2016 | Goeltz et al. |
| 2016/0308224 A1 | 10/2016 | Morris-Cohen et al. |
| 2016/0308234 A1 | 10/2016 | Reece et al. |
| 2016/0308235 A1 | 10/2016 | Reece |
| 2016/0346114 A1 | 12/2016 | Zhang et al. |
| 2017/0012307 A1 | 1/2017 | Kumamoto et al. |
| 2017/0054164 A1 | 2/2017 | Goeltz et al. |
| 2017/0222246 A1 | 8/2017 | Kreiner et al. |
| 2017/0244277 A1 | 8/2017 | Blair et al. |
| 2017/0288243 A1* | 10/2017 | Thomsen .............. H01M 8/188 |
| 2017/0291916 A1 | 10/2017 | Millard |
| 2017/0294662 A1 | 10/2017 | Madden et al. |
| 2017/0294672 A1 | 10/2017 | Warrington et al. |
| 2017/0317363 A1 | 11/2017 | Pijpers |
| 2018/0102556 A1 | 4/2018 | Puranam et al. |
| 2018/0151899 A1 | 5/2018 | Morris-Cohen |
| 2018/0277875 A1 | 9/2018 | Melough et al. |
| 2020/0044267 A1 | 2/2020 | Perry |
| 2020/0313212 A1 | 10/2020 | Loretz et al. |
| 2021/0066737 A1* | 3/2021 | Watanabe .............. H01M 8/188 |
| 2022/0085398 A1* | 3/2022 | Reece .............. H01M 8/1053 |
| 2022/0123339 A1* | 4/2022 | Song .............. H01M 8/04186 |

FOREIGN PATENT DOCUMENTS

| | | |
|---|---|---|
| CA | 2937798 | 7/2015 |
| CN | 1400333 A | 3/2003 |
| CN | 1204400 C | 6/2005 |
| CN | 103187551 A | 7/2013 |
| CN | 103579658 A | 2/2014 |
| CN | 104241661 A | 12/2014 |
| DE | 102010015504 A1 | 12/2010 |
| DE | 102011120802 A1 | 6/2013 |
| JP | H0628167 B2 | 4/1994 |
| JP | H06290795 | 10/1994 |
| JP | H087913 A | 1/1996 |
| JP | 2004087318 A | 3/2004 |
| JP | 2006351346 A | 12/2006 |
| JP | 2007073428 A | 3/2007 |
| JP | 2008078104 A | 4/2008 |
| JP | 2011228059 A | 11/2011 |
| JP | 2016039004 A | 3/2016 |
| KR | 10-2015-0113118 | 10/2015 |
| WO | WO 1997/024774 | 7/1997 |
| WO | WO 1999/039397 | 8/1999 |
| WO | WO 2003/030286 | 4/2003 |
| WO | WO 2003/097860 | 11/2003 |
| WO | WO 2008/054264 | 5/2008 |
| WO | WO 2008/073679 | 6/2008 |
| WO | WO 2008/148148 | 12/2008 |
| WO | WO 2009/040546 | 4/2009 |
| WO | WO 2010/033118 | 3/2010 |
| WO | WO 2012/177255 | 12/2012 |
| WO | WO 2013/090680 | 6/2013 |
| WO | WO 2013/138942 | 9/2013 |
| WO | WO 2014/120876 | 8/2014 |
| WO | WO 2014/181498 | 11/2014 |
| WO | WO 2015/048074 | 4/2015 |
| WO | WO 2015/065957 | 5/2015 |
| WO | WO 2015/073286 | 5/2015 |
| WO | WO 2015/099728 | 7/2015 |
| WO | WO 2015/173359 | 11/2015 |
| WO | WO 2016/129386 | 8/2016 |
| WO | WO 2016/149336 | 9/2016 |
| WO | WO 2016/168369 | 10/2016 |
| WO | WO 2020/086645 | 4/2020 |

OTHER PUBLICATIONS

R.W. Reeve: "A Sodium Borohydride-Hydrogen Peroxide Fuel Cell Employing a Bipolar Membrane Electrolyte", ECS Transactions, Jan. 1, 2012 (Jan. 1, 2012), pp. 117-129, XP055520657, US, ISSN: 1937-5862, DOI: 10.1149/1.4705487.

M.R. Mohamed et al., "Estimating the State-of-Charge of all-Vanadium Redox Flow Battery Using a Divided, Open-Circuit Potentiometric Cell", Elektronika Ir Elektrotechnika, vol. 19, No. 3, Mar. 2013 (Mar. 2013), pp. 39-41, XP055099478.

International Search Report and Written Opinion of the International Searching Authority for counterpart International Patent Application No. PCT/US22/72206, dated Sep. 22, 2022 (14 pages).

* cited by examiner

FLOW BATTERY WITH A DYNAMIC FLUIDIC NETWORK

This is a bypass continuation of International Patent Application No. PCT/US2022/072206, which was filed May 9, 2022; the contents of which is incorporated herein by reference.

TECHNICAL FIELD

This disclosure relates generally to the field of flow-battery energy storage systems.

BACKGROUND

Flow batteries, such as redox flow batteries, are rechargeable electrochemical energy storage systems that utilize the flow of electrolytes in which electrochemical reactants, typically redox active compounds, are dissolved. These electrolytes are separately contained in negative electrolyte and positive electrolyte streams and are circulated through respective half-cells of an electrochemical cell where electrical energy is either converted to or extracted from chemical potential energy in the reactants by way of reversible reduction and oxidation reactions in the electrochemical cell at ambient or near ambient temperatures.

The separation of energy and power in a flow battery provides an architectural advantage over sealed batteries, affording independent sizing (specification) of power and discharge duration for a given flow battery and flow battery system. This can in turn improve cost-effectiveness of long-duration projects and applications since power equipment is relatively expensive (on a $/kW basis) and electrolytes with dissolved active compounds are relatively inexpensive. Additionally, flow batteries are not subject to the capacity fade associated with structural/morphological changes caused by cycling sealed batteries.

In flow batteries and flow battery systems (especially larger systems) that may comprise multiple electrochemical cells (or stacks), it is useful to monitor characteristics of each of the electrolytes. An inline measurement of an electrolyte's characteristics (e.g., SOC, pH, turbidity, etc.) can provide diagnostic insight for a flow battery that is not available in sealed batteries, as sealed batteries permit observation of voltage and may not allow for other active diagnostics of electrolytes and/or their active materials during use.

For example, it may be desirable to monitor the state-of-charge (SOC) of each of the electrolytes, e.g., to know when the flow battery is "full" or "partially charged" or "empty" before actually realizing these states. It may also be desirable to monitor an electrolyte's SOC in real time so as to identify and, when possible, mitigate parasitic loss caused by excess electrolyte flow or other issues within the system. Monitoring the SOC could also be used to create a reference state for battery health and/or capacity. The SOC of the electrolyte expresses the concentration ratio of charged active material to charged and discharged active material, and is a useful parameter for describing what fraction of a battery's capacity is utilized in storing energy. If all the active material is discharged, the electrolyte is said to have a state of charge of 0%, and if all the active material is in the charged state, the state of charge is 100%. At an intermediate state-of-charge (0%<SOC<100%) there will be a non-zero concentration of both charged active material and discharged active material.

It may also be desirable to hold an arbitrary SOC. For example, it may also be desirable to de-energize the stacks during idle periods for safety and to limit parasitic reactions (e.g., $H_2$ evolution). Conventional methods include leaving electrolyte in communication with electrochemical cell(s) and electrically disconnecting (cells return to open-circuit voltage); however, this method may lead to high self-discharge, voltage remains on stacks, and uncontrolled voltage that can lead to degradation or inefficiencies. Draining electrochemical cell(s) on shut down (e.g., elevate cell(s) and gravity drain to external tanks) is another conventional method to control SOC; however, packaging and structural design constraints, and wet/dry cycling of stacks can lead to degradation and or flammability issues ($H_2$ from tank headspace), such that there is a continuing need for improvements over conventional methods.

Further, because flow batteries require flowing electrolyte, instruments (such as inline instruments) can be used as part of a control system to optimize electrolyte flow rate. This can reduce the pumping losses and improve round-trip efficiency (energy recovered/energy input).

In existing flow batteries and flow battery systems, however, improvements to system process controls and fine process controls and diagnostics are still needed. Further, the shutdown and/or maintenance of existing flow batteries and flow battery systems can require draining the electrolyte from the main electrolyte sources (which can be relatively large) and from the electrochemical cell(s) in which the electrodes, membranes, current collectors, bipolar (and monopolar) plates, and other components reside. Such electrolyte draining can, however, be time-consuming and expensive, and can also require taking all or part of the flow battery or flow battery system off-line during the time that the main electrolyte sources and/or electrochemical cell(s) are being drained, as well as off-line during the time for re-filling with electrolyte and bringing back to operating condition, such as for start-up.

In addition, the need to occasionally drain main electrolyte sources and/or electrochemical cell(s) can require that flow batteries and flow battery systems are constructed such that the main electrolyte sources (such as tanks) and/or electrochemical cell(s) are at a height relative to the ground so as to facilitate gravity-assisted draining of the electrolyte. Such constructions can be expensive and cumbersome, and the need for elevated system architectures can limit the locations for construction.

The operating performance of flow batteries and flow battery systems can be impacted by a number of factors. In many aspects, these factors may not be independent of one another. To maintain high performance of flow batteries and flow battery systems, reduce operating and structural burdens, and maintain safety of operators, a number of diagnostic, treatment, and system controls are desirable in a flow battery or flow battery system. Illustrative, non-limiting examples of detection, measurement, and control instruments and systems that are compatible with flow batteries and flow battery systems include: (i) an electrode in a balancing (or rebalancing) cell, which may be configured to generate $O_2$ within a half-cell chamber of the balancing cell; (ii) instruments to determine a ratio of oxidized and reduced forms of a redox couple in an electrolyte; (iii) instruments to measure a rate of change in equilibrium reduction potential of a half-cell of an electrochemical cell as charge is passed into an electrolyte solution within the half-cell and optionally correlating that measured rate of change with the SOC of the half-cell; (iv) a balancing cell for generating protons and hydroxide ions to correct pH fluctuations brought about by parasitic reactions, where pH of two electrolytes may be adjusted in this manner simultaneously and/or sequentially; (v) a balancing cell for adding or removing solvent to or from an electrolyte solution, such as water with respect to an aqueous electrolyte solution; (vi) instruments to determine SOC of an electrolyte solution in a half-cell through various methods; and (vii) systems to regulate and optimize electrolyte solution flow rates throughout a flow battery system, such as half-cells, and that are responsive to measured or calculated values of voltage (V), current (I), flow rate, and power (P) entering and exiting the half-cell. Flow batteries having a dynamic fluidic network system, as disclosed herein, may include, for example, one or more detection, measurement, and control instruments and systems as may be needed or desired to fit the needs of any flow battery system.

Accordingly, there is a long-felt need in the art for flow batteries and flow battery systems capable of monitoring multiple aspects of flow battery fluid flow characteristics and performing system diagnostics, as well as other operating features. There is also a long-felt need in the art for improved methods of monitoring multiple aspects of flow battery fluid flow characteristics and performing system diagnostics, as well as other operating features.

Aspects of the present disclosure provide flow batteries, flow battery systems, and methods that allow fluid volume control; managed flow rates; balancing of plant during operation; control of charge of electrolyte during start-up, maintenance, and shutdown; control (including mitigation and management) of shunt current; diagnostic checks of battery and system components; instruments for control system inputs and measurements; an alternative to shutdown in response to upset conditions; assessment of battery and system components; and simplified flow battery start-up, by inclusion of a dynamic fluidic network as described in detail below.

SUMMARY

The present disclosure provides, inter alia, solutions to existing problems and needs for improved fluid flow characteristics, shunt current control, performance, enhanced structural features, and effective diagnostics and treatment within a flow battery or flow battery system. In providing these solutions, this disclosure presents dynamic, structural, diagnostics and treatment, system control, and performance features of flow batteries and flow battery systems as summarized immediately below.

The disclosure presents flow batteries with a dynamic (i.e., modifiable) fluidic network system and associated dynamic fluidic networks for positive and negative electrolytes. In some aspects, this dynamic fluidic network system may include flow structures, which may in turn include subflow structures, such as one or more series subflow structures, parallel subflow structures, shunt current control subflow structures (such as for shunt current mitigation and/or management), counterflow subflow structures, measurement and diagnostic subflow structures, treatment (such as electrolyte rebalancing) subflow structures, source subflow structures, and drain subflow structures. In some aspects, the dynamic fluidic network system may also comprise reticulated flow and subflow structures configured in parallel and in series in relation to each other. A flow battery has an overall dynamic fluidic network system, which, in aspects, may be described as comprising a first dynamic fluidic network associated with a first electrolyte and a second dynamic fluidic network associated with a second electrolyte.

In some aspects, the dynamic fluidic network system and its components have fluid flow characteristics based on size and volume that vary from the flow structures through the subflow structures and further vary between parallel subflow structures and subflow structures that operate in series. To these ends, the system as a whole has "n" flow and subflow structures having volumes $V_1, V_2, V_3, \ldots V_n$ and cross-sectional areas $A_1, A_2, A_3, \ldots A_n$ that define size and volume capacity.

Generally, in regions of each dynamic fluidic network the flow and subflow structures will vary from relatively large to progressively smaller, while in other regions, the progression will be from relatively small to progressively larger, and others will maintain similar sizing. The architectures of flow and subflow structures in a dynamic fluidic system or network in no way limits source volumes (including tanks, or even multiple tanks) or the volumes of liquid electrolyte that may be delivered to and removed from cells or stacks to achieve desired results (and therefore do not limit achieving desired operational metrics including electrical power outputs and charge/discharge cycle times).

Subflow structures comprising an instrument (non-limiting examples being monitors, sensors, processors, controllers) to measure one or more characteristics of an electrolyte are measurement or diagnostic subflow structures. In some aspects, the subflow structure may be placed relatively close to and in fluid communication with the electrochemical cell(s). In certain aspects, this subflow structure has an electrolyte volume that is less than the total volume of the respective dynamic fluidic network. This subflow structure allows the flow battery to make state of charge swings rapidly without having to charge or discharge the main electrolyte source and/or regions of the dynamic fluidic network. This subflow structure may fluidically communicate with other flow or subflow structures, or may be placed in fluid isolation from one or more of them. In other aspects, a measurement or diagnostic subflow structure may comprise or be associated with multiple instruments to measure the same or different characteristics of the electrolyte. In certain aspects, exemplary characteristics include pressure, conductivity, color, temperature, turbidity, viscosity, ground-reference potential, density, concentration, water activity, oxidation-reduction potential (ORP), pH, state of charge, and combinations thereof. As described in further detail below, some or all of the instruments and controls may be located outside a fluidic train or sampling segment, and those instruments outside may be associated with electrolyte in the fluidic train or sampling segment. In aspects, a first fluidic train including a first sampling segment is associated with a single half-cell; in aspects, they may be associated with more than one half-cell. In aspects, a second fluidic train including a second sampling segment is associated with a single half-cell; in aspects, they may be associated with more than one half-cell. In aspects, all the instruments are located outside of a fluidic train.

In further aspects, the disclosed approach allows an operator to perform diagnostics with a diagnostic subflow structure on other regions (sub-units) of the flow battery and its dynamic fluidic network system, and also allows an operator to energize and/or de-energize sub-units of the flow battery without significantly affecting the flow battery or flow battery system as a whole.

As explained above, existing methods for achieving the foregoing include fully draining the main electrolyte source and/or the electrochemical cell(s) (stacks), which in turn requires transferring containers and pumps to return the electrolyte to the flow battery. The disclosed approach represents a significant improvement over existing approaches, as the disclosed approach allows for finer control over the process with very little waste of energy and electrolyte to achieve a more precise control. This subflow structure can be installed close to the electrochemical cell(s) so as to allow for continuous flow within the cells. Such an approach brings the total capacity waste to essentially only the volume of the subflow structure, instead of also including the volume of the main electrolyte source and the remainder of the dynamic fluidic network. This disclosed subflow structure can also include one or more control valves, with accompanying control systems to accurately maintain capacity.

An example of an anomaly requiring correction (diagnosis and treatment) is charge imbalance. Charge imbalance results from parasitic chemical reactions or membrane crossover phenomena that disproportionally affect one electrolyte over another. One example of a parasitic reaction that leads to electrolyte charge imbalance is water splitting, which evolves hydrogen and oxygen. The apparatuses and methods of the instant disclosure can be used to determine SOC and to remedy any imbalances. This can be accomplished (as described elsewhere herein) without necessarily draining the main electrolyte sources of the flow battery system, as those sources (such as tanks) can be placed into fluid isolation from the membrane within which crossover may take place or electrodes where parasitic reactions may take place so that crossover (if any) and parasitic reactions can be investigated while minimizing the amount of electrolyte exposed to the membrane or electrode. Charge imbalances may be corrected by means of a subflow structure comprising a rebalancing cell.

Also provided are flow batteries and flow battery systems having dynamic fluidic networks as disclosed above and discussed in more detail below, which comprise one or more of bipolar and monopolar plate assemblies (BPPA and MPPA, respectively). A BPPA has a frame element and an inner plate having two sides, a positive side and a negative side; an MPPA has a frame element and an inner plate having one side which is either positive or negative. In some aspects, the frame element forms a perimeter around the entirety of the inner plate. The frame element and inner plate are joined together to form a single, unitary, integral structure, where the two components (frame and inner plate) may be substantially coplanar. Each side of a BPPA or the active (positive or negative) side of an MPPA comprise at least six different flow structures. These flow structures further comprise two subflow structures wherein the flow structures of each subflow structure are structurally and fluidically connected in series and form a first and second subflow structure on each side of a BPPA or a first and second subflow structure on one side of an MPPA. The frame element and the inner plate may be made of different materials, and the inner plate may comprise one or more electrically conductive materials. In aspects, more specifically, (a) the bipolar and monopolar plate assemblies having inlet (source) and outlet (drain) conduits, inlet and outlet manifolds, which may have different flow paths, and inner plate subflow structures comprising a plurality of "n" inlet and outlet structures with the same or different volumes $V_n$, cross-sectional areas $A_n$, lengths $L_n$, and paths $P_n$ in electrode regions of a half-cell, the plate commonly having a non-conductive border region and an active region, commonly an inner plate; (b) conductive end plates in flow battery cells that can electronically communicate with other cells in a flow battery cell stack or system; (c) positive and negative flow structures that provide electrolytes to a multiplicity of cells in a stack or system; and (d) other features as described more fully below. The structure of the bipolar and monopolar plate assemblies may control flow dynamics and shunt currents. The inner plate's structure may have a first flow structure, a second flow structure, a third flow structure, a fourth flow structure, etc. which may or may not be fluidically connected to each other, aside from their direct connection to the manifolds, and may vary in relation to others in terms of V, A, L, and P values.

BRIEF DESCRIPTION OF THE DRAWINGS

In order to provide an understanding of aspects of the present disclosure, reference is made to the appended drawings, in which reference numerals refer to components of exemplary aspects of the disclosure. The appended drawings are illustrative only and do not limit the scope of the present disclosure or the appended claims. For simplicity and clarity of illustration, features illustrated in the appended drawings are not necessarily drawn to scale. Further, where considered appropriate, reference labels have been repeated among the figures to indicate corresponding or analogous elements.

DETAILED DESCRIPTION OF ILLUSTRATIVE ASPECTS

Figure 1:
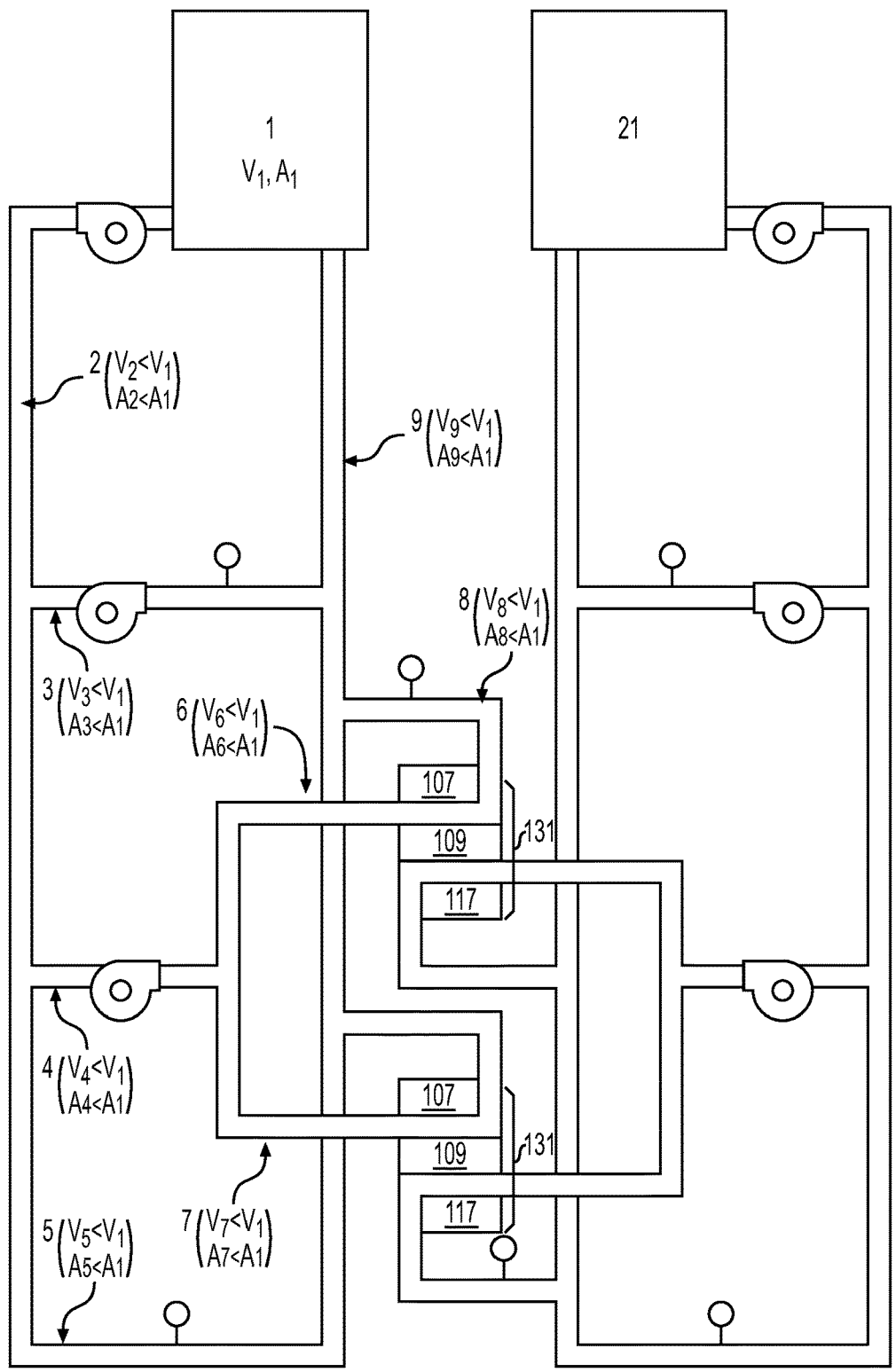
FIG. 1 depicts a general schematic of a flow battery having an exemplary dynamic fluidic network system according to one aspect of the present disclosure.

The present disclosure may be understood more readily by reference to the following detailed description of desired aspects and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

As used herein, the singular forms "a," "an," and "the" include plural referents unless the context clearly dictates otherwise. As such, the terms "a" (or "an"), "one or more", and "at least one" are used interchangeably herein.

As used herein, the term "comprising" should be understood as having its open-ended meaning of "including." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps. For example, a composition that comprises components A and B may be a composition that includes A, B, and other components, but may also be a composition made of A and B only.

As used herein, the terms "about" and "at or about" refer to small fluctuations. It is generally understood, as used herein, that it is the nominal value indicated less than or equal to ±10% variation, such as less than or equal to ±2%, less than or equal to ±1%, less than or equal to ±0.5%, less than or equal to ±0.2%, less than or equal to ±0.1%, or less than or equal to ±0.05%, unless otherwise indicated or inferred. For example, "about 10%" may indicate a range of 9% to 11%, and "about 1" may mean from 0.9-1.1. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise. For instance, "about 5.0" includes 5.0. Other meanings of "about" may be apparent from the context, such as rounding off, so, for example "about 1" may also mean from 0.5 to 1.4.

As used herein, the term "substantially" refers to a property having a statistical occurrence greater than about 75%.

All ranges disclosed herein are inclusive of the recited endpoint and all the intermediate values, including decimal values. The endpoints of the ranges and any values disclosed herein are not limited to the precise range or value; they are sufficiently imprecise to include values approximating these ranges and/or values.

As used herein, the term "flow battery system," refers to a flow-battery energy storage system comprising the flow battery of the present disclosure. In certain aspects, the flow battery system comprises one or more ancillary systems, such as a heat exchanger, a ventilation system, a power conversion system, a power source/load, etc.

As used herein, the term "electrochemical cell" refers to a device capable of either generating electrical energy from chemical reactions or using electrical energy to cause chemical reactions. An electrochemical cell comprises two half-cells, which may be separated by a membrane. An electrochemical cell may comprise electrodes (anode and cathode), a membrane, current collectors, and bipolar or monopolar plate assemblies. Electrochemical cells may be in parallel or in series (commonly called a stack in flow batteries). The term "stacks" refers to multiple electrochemical cells adjacent to each other, in fluid and electronic communication.

As used herein, the term "dynamic fluidic network system" refers to a network of flow structures and subflow structures through which electrolyte may flow to and from the main electrolyte source(s), including within the electrochemical cell.

As used herein, the term "fluidic network" refers to that portion of a dynamic fluidic network system associated with a respective half-cell. A "dynamic fluidic network" is a fluidic network with flow paths that may be modified during operation or as needed. In a stack, a dynamic fluidic network system will have multiple fluidic networks.

As used herein, the term "electrode region" refers to a region of flow and subflow structures disposed within a given half-cell of the electrochemical cell where ionic current is observed within the electrolyte (i.e., where the electrolyte is in contact with a region comprising a static, non-conductive portion of the assembly, an electrode, and a separator).

As used herein, the term "fluidic train" refers to a subflow structure of a dynamic fluidic network that may be used to isolate or connect portions of the flow battery. For example, a fluidic train and its associated electrode region may be used in connection with the term "diagnostic subflow structure," especially in relation to FIGS. 2-7 and in detailed descriptions of the content of those figures.

As used herein, the term "sampling segment" refers to a location within a fluidic train where electrolyte at that location may be tested (whether in a discrete manner or in an ongoing or continuous manner) for one or more characteristics of the electrolyte.

As described more fully below, the following structures and other features are provided herein. The disclosed technology provides a number of advantages over existing approaches.

Some such advantages are provided immediately below.

1—Dynamic Fluidic Network Systems and Fluidic Networks

This disclosure provides a dynamic (i.e., modifiable) fluidic network system comprising fluidic networks with flow structures and subflow structures with at least one fluidic network configured to be modified between two or more states with varying flow paths for electrolyte.

Some flow and subflow structures may be placed in fluid isolation from other flow and subflow structures and electrolyte sources as may be required by diagnostic instrument feedback or discovered anomalies within or without the flow battery or flow battery system that can adversely affect the battery or system or any portion thereof. Some flow and subflow structures may be placed in fluid communication with other flow and subflow structures and electrolyte sources as may be required, for example, by for ionic communication. The dynamic fluidic network system may comprise fluidic networks that are identified as first and second [dynamic] fluid networks, associated respectively, with first and second electrolytes.

The dynamic fluidic network system and its associated dynamic fluidic network(s) provide platforms for accomplishing at least one, and potentially all, of the following, which are intended to be illustrative of important features of flow batteries and flow battery systems of the present disclosure: (i) Fluid volume control; (ii) Manage flow rates including flow rates through half-cells, cells, stacks, including smaller structures within cells and half-cells; (iii) balancing of electrolyte using a balancing system which may occur while a battery or stack is in operation; (iv) Control charge of each electrolyte separately or concurrently, such as for shutdown or during maintenance;

(v) Shunt current control (including mitigation and management); (vi) A variety of diagnostic checks of components of the flow battery or flow battery system; (vii) Instruments including sensors for control system inputs and measurements, including inline instruments, real-time monitoring, and instrument calibration, (viii) Provide an alternative to a shutdown in response to upset conditions created by anomalies; (ix) Assessment of fluid battery components; (x) Simplified flow battery start-up; and (xi) Maintaining different flow patterns in different parts of the flow battery.

2—Holding Charge while Idle

An example of control charge of each electrolyte is to hold an arbitrary SOC when a flow battery is idle. It may also de-energize the electrochemical cell(s) during idle periods for safety and to limit parasitic reactions (e.g., $H_2$ evolution).

One conventional method for doing so is to leave the electrolytes in fluid communication with the electrochemical cell(s) and then electrically disconnect the cell(s), thereby returning the cell(s) to open-circuit voltage. Some disadvantages of doing so are high self-discharge, having voltage remain on cell(s), and that uncontrolled voltage can lead to degradation.

Another conventional method for doing so is to drain the electrochemical cell(s) on shut down (e.g., using gravity to drain the cell(s)). There are disadvantages to doing so, e.g., packaging constraints enforced by the need to arrange the system to allow for gravity draining, the fact that wet/dry cycling of cell(s) can lead to degradation and or flammability issues, such as $H_2$ present in tank headspace, and the fact that it is generally burdensome to drain cell(s) and re-wet them. In addition to raising the tanks for gravity assist, additional pumps, piping, and alternative temporary storage containers may also be needed.

In contrast, the flow battery of the present disclosure may allow for controlled shutdown (to an arbitrary SOC) of the small volume of electrolyte in communication with electrochemical cell(s), such as in a stack. In this way, the cell(s) stay flooded (i.e., wetted), and voltage hazards are eliminated.

3—Upset Conditions

Another advantage of the flow battery of the present disclosure may pertain to the response optionality provided during upset conditions. Rather than abruptly removing power when an anomaly is detected and risking component damage, a controlled stop and start can be executed by taking advantage of a diagnostic subflow structure (e.g., to protect the larger main electrolyte sources and flow structures) under conditions where immediate hazard removal is not required.

It is undesirable to have a full shutdown due to an anomaly except in an emergency, such as conditions that could lead to injury or be life threatening. This feature allows a partial shutdown to figure out what the problem is, without risking damage to half-cells, cells, stacks, or electrolytes. A bad pH reading, for example, is undesirable but is not life threatening—resolving the anomaly with a "soft stop" would be preferred to shut down. While most anomalies will be internal to the flow battery, this disclosure does not exclude methods and systems for resolving anomalies that may be seen as external to the flow battery.

4—Electrochemical Cell Health Checks

Electrochemical cells can fail at times, e.g., due to the crossover of electrolytes. The flow and subflow structures of the flow battery of the present disclosure can include sensors (pH, oxidation-reduction potential (ORP), pressure, flow rates, and the like) so that diagnostics can be performed before restoring fluid communication between the electrochemical cell(s) and the electrolyte source(s) to avoid potentially contaminating a large volume of electrolyte. This technique can also detect component degradation or failure. Electrochemical cell health can also be checked during the first time a flow battery is run by using a diagnostic subflow structure as the electrolyte source, in place of the larger electrolyte sources. This flow battery and related techniques can also detect electrolyte balancing component failures.

5—Instrument Calibration

The flow battery of the present disclosure may permit instrument calibration, such as to run through a full charge-discharge SOC swing, e.g., to set the ORP in the system. A diagnostic subflow structure, which is comparatively small in volume in relation to the total volume of the system, allows this to be done with limited electricity consumption. One can also circulate only one electrolyte and thereby swing a single electrolyte through a wide SOC range (in the diagnostic subflow structure) while the other electrolyte stays in a comparatively narrow SOC band.

6—Simplified Flow Battery Start-Up

During commissioning, flow battery electrolyte must be pre-charged to increase SOC and thereby cell voltage from ~0 VDC, but other reference voltages can be used, to the minimum voltage required to engage the inverter. The flow battery of the present disclosure may allow this to happen rapidly and with minimal input power, as one can charge the relatively small volume of electrolyte within a diagnostic subflow structure so as to engage the inverter. Less desirable alternatives to the disclosed technology include, e.g., (i) loading active material at elevated SOC, which can be hazardous; and (ii) pre-charging the entire electrolyte source to the minimum SOC.

In one aspect, the present disclosure provides a (redox) flow battery comprising: a dynamic fluidic network system comprising a first dynamic fluidic network and second fluidic network, which may be dynamic, wherein the flow battery has a first half and a second half. The first half comprises (i) a first main electrolyte source configured to contain a first electrolyte, (ii) a first electrode region configured for electronic communication with the first electrolyte, and (iii) the first fluidic network that is dynamic and configured for fluid communication with the first main electrolyte source and comprising the first electrode region, a first fluidic train, and a first counterflow structure. The first fluidic train comprises a first sampling segment. The first fluidic train is convertible between a first state and a second state. The first state placing the first main electrolyte source and the first dynamic fluidic network, outside the first fluidic train and first electrode region, into fluid communication with the first electrode region. The second state placing the first main electrolyte source and the first dynamic fluidic network, outside the first fluidic train and first electrode region, into fluid isolation from the first electrode region and placing the first electrode region into fluid communication with the first sampling segment. The second half comprises (i) a second main electrolyte source configured to contain a second electrolyte, (ii), a second electrode region configured for electronic communication with the second electrolyte, and (iii) the second fluidic network configured for fluid communication with the second main electrolyte source and comprising the second electrode region and a second fluidic train. The second fluidic train is configured to place the second main electrolyte source and second fluidic network, outside the second fluidic train and second electrode region, into fluid communication with the second electrode region. The second fluidic network may be dynamic and further comprise a second counterflow structure.

In another aspect, the present disclosure provides a method of converting a flow battery having a first half and a second half. The first half comprises a first main electrolyte source, a first electrolyte, and a first dynamic fluidic network. The first dynamic fluidic network comprises a first counterflow structure, a first electrode region and a first fluidic train that is convertible between a first state and a second state and has a first sampling segment. The method converts the first fluidic train from the first state to the second state. The first state placing the first main electrolyte source and the first dynamic fluidic network, outside the first fluidic train and first electrode region, in fluid communication with the first electrode region. The second state placing the first main electrolyte source and the first dynamic fluidic network, outside the first fluidic train and first electrode region, in fluid isolation from the first electrode region. While the first fluidic train is in the second state, the method further comprises determining a characteristic of first electrolyte that is in fluid communication with the first electrode region. The second half comprises a second main electrolyte source, a second electrolyte, and a second fluidic network that may be dynamic. The second fluidic network may be dynamic and comprise a second counterflow structure, a second electrode region, and a second fluidic train.

The disclosed technology may allow for fine control over the process with very little waste of energy. A diagnostic subflow structure can be installed comparatively close to the electrochemical cell(s) and allow for electrolyte to flow only through the diagnostic subflow structure, including the electrode region of the electrochemical cell(s). This brings the total potential capacity waste to just the volume of the subflow structure, including the electrode region. The subflow structure can use one or more control valves, with an accompanying control system to accurately maintain capacity.

An exemplary flow battery of the present disclosure is shown in FIG. 1. FIG. 1 is representative only, is not necessarily to scale, and does not show all flow, subflow, or other structures, but rather shows representative structures, which serve to illustrate one potential setup of the battery as a whole. As shown, a flow battery can include a dynamic fluidic network system comprising a dynamic fluid network in which various "n" flow and subflow structures have volumes ("$V_n$") and cross-sectional areas ("$A_n$"), which define size and volume capacity of the structures. Each flow and subflow structure may be configured, in relation to each other, to flow in parallel or series, depending on function.

As shown in FIG. 1, a flow battery can include one or more electrochemical cells 131 that features a separator 109 (e.g., a membrane) that separates two electrodes 107 and 117 of the electrochemical cell 131. Tanks 1 and 21 can contain a first electrolyte and a second electrolyte, respectively. FIG. 1 further shows a main source flow structure 2, parallel and series subflow structures (3, 4, 5, 6, 7, 8), measurement (or diagnostic) structures (3, 4, 5, 8), and drain flow structure 9, as well as interrelationships between them. Each of the flow and subflow structures may be configured with additional subflow structures depending upon the desired function of the flow and subflow structure.

The measurement (or diagnostic) structures, as depicted in FIGS. 1-10, do not show either absolute or relative positions of instruments, but is intended to show that a multiplicity of monitoring, measurement, and other inline (or not inline) and system-related instruments or tools may be placed in various locations within a dynamic fluid network. Similarly, the electrolyte moving devices (such as pumps), as depicted in FIGS. 1-10, do not show either absolute or relative positions of these devices, but is intended to show that a multiplicity of devices may be used to create flow and counterflow of electrolyte within the dynamic fluidic network system. The presence of these measurement structures and electrolyte moving devices in FIGS. 1-10 should not be construed as meaning that either a measurement device or an electrolyte moving device is a requirement of the flow batteries disclosed herein.

Parallel subflow structure 3 can be configured, for example, as a counterflow structure, when appropriately located valves are configured and activated. In practice there may be a multiplicity of these structures, which may be clustered together, spaced apart, or both. The placements of these structures in FIG. 1 are not intended to show either relative or absolute placement thereof. Similarly, the parallel and series subflow structure configuration is not intended to demonstrate that this branching structure is required, rather, it is intended to show conceptually that one or more subflow structures may deliver an electrolyte to parallel and/or series subflow structures. Further, the parallel and series subflow structures are not intended to be limiting in number. For example, such structures may supply any number of adjacent cells in a stack with the same electrolyte. The exemplary flow battery shown in FIG. 1 may incorporate the features shown in the FIGS. 2-12 described in detail below.

As shown in FIGS. 2-5, there is a diagnostic subflow structure for each of the first and second electrolytes which may be the same or different, and the related subflow structures may be designated as a first diagnostic subflow structure (or first fluidic train and first electrode region) and a second diagnostic subflow structure (or second fluidic train and second electrode region).

When they are different, there will typically be a positive electrolyte and a negative electrolyte (positive diagnostic subflow structure with a positive fluidic train, and negative diagnostic subflow structure with a negative fluidic train). Unless stated otherwise, either the first or second electrolyte may be positive and the other negative where such electrolytes are present. FIGS. 2-5 are simplified schematic diagrams that focus on the diagnostic subflow structures and do not show the relationship between the subflow structures and the larger dynamic fluid network.

Figure 2:
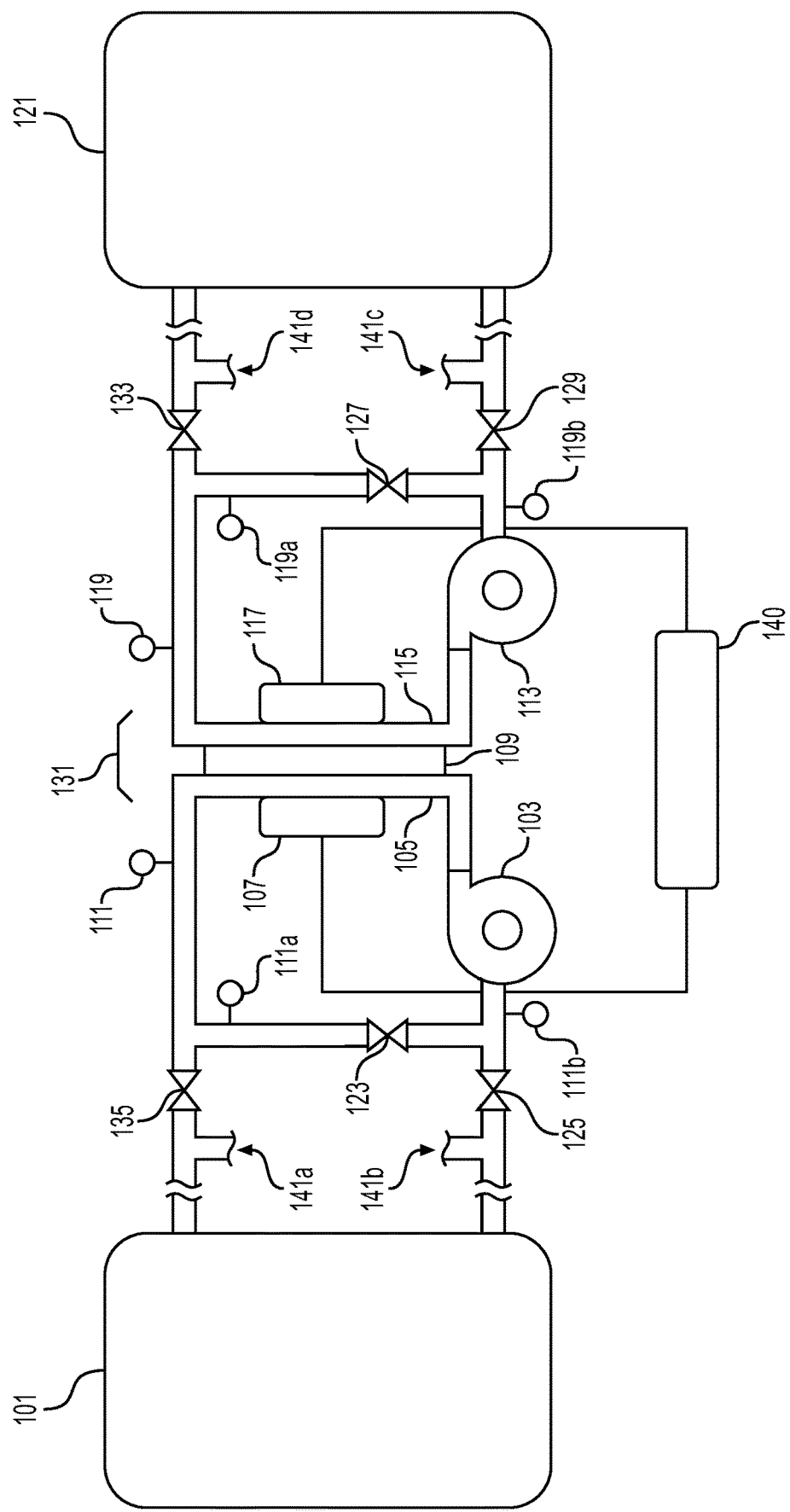
FIG. 2 depicts a general schematic of a flow battery having an exemplary dynamic fluidic network system according to a second aspect of the present disclosure.

An exemplary flow battery of the present disclosure is shown in FIG. 2. FIG. 2 is representative only, is not necessarily to scale, and does not show all flow, subflow, or other structures, but rather shows representative structures, which serve to illustrate one potential setup of the flow battery as a whole. As shown in that figure, a flow battery can include an electrochemical cell 131 that features a separator 109 (e.g., a membrane) that separates two electrodes 107 (which includes flow plate 105, which accommodates an electrolyte from tank 101) and 117 (which includes flow plate 115, which accommodates an electrolyte from tank 121) of the electrochemical cell 131. The flow plates are typically a BPPA or MPPA. An electrode is suitably a conductive material, such as a metal, carbon, graphite, and the like. Tank 101 can contain a first electrolyte (not shown), which comprises a first active material capable of being cycled between an oxidized and reduced state.

A pump 103 can effect transport of the first electrolyte comprising a first active material from the tank 101 to the electrochemical cell 131. The flow battery can also include a second tank 121, which contains a second electrolyte comprising a second active material. The second active material can be the same as the first active material, though this is not a requirement.

A second pump 113 can effect transport of the second electrolyte to the electrochemical cell 131. Pumps can also be used to effect transport of the electrolytes from the electrochemical cell to the tanks of the battery. Other methods of effecting fluid transport—e.g., siphons, gravity—can be used to transport electrolyte into and out of the electrochemical cell. Also shown is a power source or load 140, which completes the circuit of the electrochemical cell and allows the user to collect or store electricity during operation of the cell. An exemplary power source or load includes non-flow batteries.

Exemplary separators are generally categorized as solid, porous, or a combination thereof. Solid separators in the form of solid membranes may comprise an ion-exchange membrane, wherein an ionomer facilitates mobile ion transport through the body of the polymer. The facility with which ions conduct through the membrane can be characterized by a resistance, typically an area resistance in units of $\Omega cm^2$. The area resistance is a function of the membrane's conductivity and the membrane's thickness. Thin membranes are desirable to reduce inefficiencies incurred by ion conduction and therefore can serve to increase voltage efficiency of the energy storage device. Active material crossover rates are also a function of membrane thickness, and typically decrease with increasing membrane thickness. Crossover represents a current efficiency loss that must be balanced with the voltage efficiency gained by utilizing a thin membrane.

By "crossover" is meant material transfer, e.g., one or more components of a positively charged electrolyte that originates in the first tank of a system becoming disposed in a negatively charged electrolyte that originates in the second tank of a system. Crossover can give rise to undesired operational issues, e.g., local solid formation and in turn flow clogging; local parasitic reactions that can result in gas generation or pH change; long term loss of material and capacity decrease; or cell electrical shorting.

Porous separators in the form of porous membranes may be non-conductive membranes, which allow charge transfer between two electrodes via open channels filled with conductive electrolyte. Porous membranes are permeable to liquid or gaseous chemicals. This permeability increases the probability of active materials passing through porous membrane from one electrode to another causing cross-contamination and/or reduction in cell energy efficiency. The degree of this cross-contamination depends on, among other features, the size (the effective diameter and channel length), and character (e.g., surface characteristics) of the pores, the nature of the electrolyte and its active material, and the degree of wetting between the pores and the electrolyte.

Porous membranes may also be ion-exchange membranes, which are sometimes referred to as polymer electrolyte membranes (PEM) or ion conductive membranes (ICM). The membranes according to the present disclosure can comprise any suitable polymer, typically an ion exchange resin and, thus be a polymeric anion exchange membrane, polymeric cation exchange membrane, membrane composite of polymers with organic or inorganic components, or a combination thereof.

The mobile phase of such a membrane can comprise, and/or is responsible for the primary or preferential transport (during operation of the battery) of at least one mono-, di-, tri-, or higher valent cation and/or mono-, di-, tri-, or higher valent anion, other than protons or hydroxide ions.

Additionally, substantially non-fluorinated membranes that are modified with sulfonic acid groups (or cation exchanged sulfonate groups) can also be used. Such membranes include those with substantially aromatic backbones, e.g., polystyrene, polyphenylene, bi-phenyl sulfone (BPSH), or thermoplastics such as polyetherketones or polyethersulfones. Examples of porous ion-exchange membranes include Nafion®.

Battery-separator style porous membranes can also be used. Because they contain no inherent ionic conduction capability, such membranes may be impregnated with additives or surface treatments in order to function. These membranes are typically comprised of a mixture of a polymer and an inorganic filler, and have open porosity. Suitable polymers include those chemically compatible with the electrolytes of the presently described batteries, including high density polyethylene, polypropylene, polyvinylidene difluoride (PVDF), or polytetrafluoroethylene (PTFE). Suitable inorganic fillers include silicon carbide matrix material, titanium dioxide, silicon dioxide, zinc phosphide, and ceria. The membrane can be supported internally with a substantially non-ionomeric structure, including mesh structures such as are known for this purpose in the art. It should be understood that a membrane can comprise multiple layers; a membrane can also be a single-layer membrane.

The disclosed methods are flexible in their utility with a range of active materials, such as redox couples, for use in the electrolytes. Suitable redox couples include those couples comprising a metal or metalloid of Groups 2-16, including the lanthanide and actinide elements; for example, including those where the redox couple comprises Al, As, Ca, Ce, Co, Cr, Cu, Fe, Mg, Mn, Mo, Ni, Sb, Se, Si, Sn, Ti, V, W, Zn, or Zr, including coordination compounds of the same. In various aspect of the present disclosure, the active materials may be solid, liquid, or gas, and may be in solutions, slurries, suspensions, or dispersions. In some aspects, the electrolyte may be aqueous or non-aqueous electrolyte solutions. The electrolyte may further comprise buffering materials, a supporting electrolyte, water miscible solvent(s), mobile ions, viscosity modifiers, wetting agents, and other components known to those skilled in the art. The electrolyte may also comprise impurities and unwanted byproducts that may be removed by a subflow structure, such as a balancing cell. Electrolytes with active materials can be stored in a tank, in a container open to the atmosphere, or simply vented to the atmosphere.

As shown, a flow battery can also include one or more instruments 111, 111a, and 111b, such as monitors, sensors, or processors, whether inline or not inline. Without being bound to any particular configuration, a flow battery can include an instrument positioned so as to monitor a condition of an electrolyte that has entered or left the electrochemical cell but is also in fluid isolation from the remainder of the dynamic fluidic network and the main electrolyte source.

A flow battery can also include one or more of instruments 119, 119a, and 119b, such as monitors, sensors, or processors, whether inline or not inline. The instruments can be used to determine a characteristic of active material within the flow battery.

By reference to non-limiting FIG. 2, instrument 111 can be used to monitor electrolyte that has left electrochemical cell 131. Instrument 111a can be used to monitor electrolyte that is in a fluidic train in fluid isolation (e.g., when valves 135 and 125 are closed) from tank 101. Instrument 111b can be used to monitor fluid that is transported from tank 101 to electrochemical cell 131.

Similarly, instrument 119 can be used to monitor electrolyte that has left electrochemical cell 131. Instrument 119a can be used to monitor electrolyte that is in a fluidic train in fluid isolation (e.g., when valves 133 and 129 are closed) from tank 121. Instrument 119b can be used to monitor electrolyte that is transported from tank 121 to electrochemical cell 131.

Figure 5:
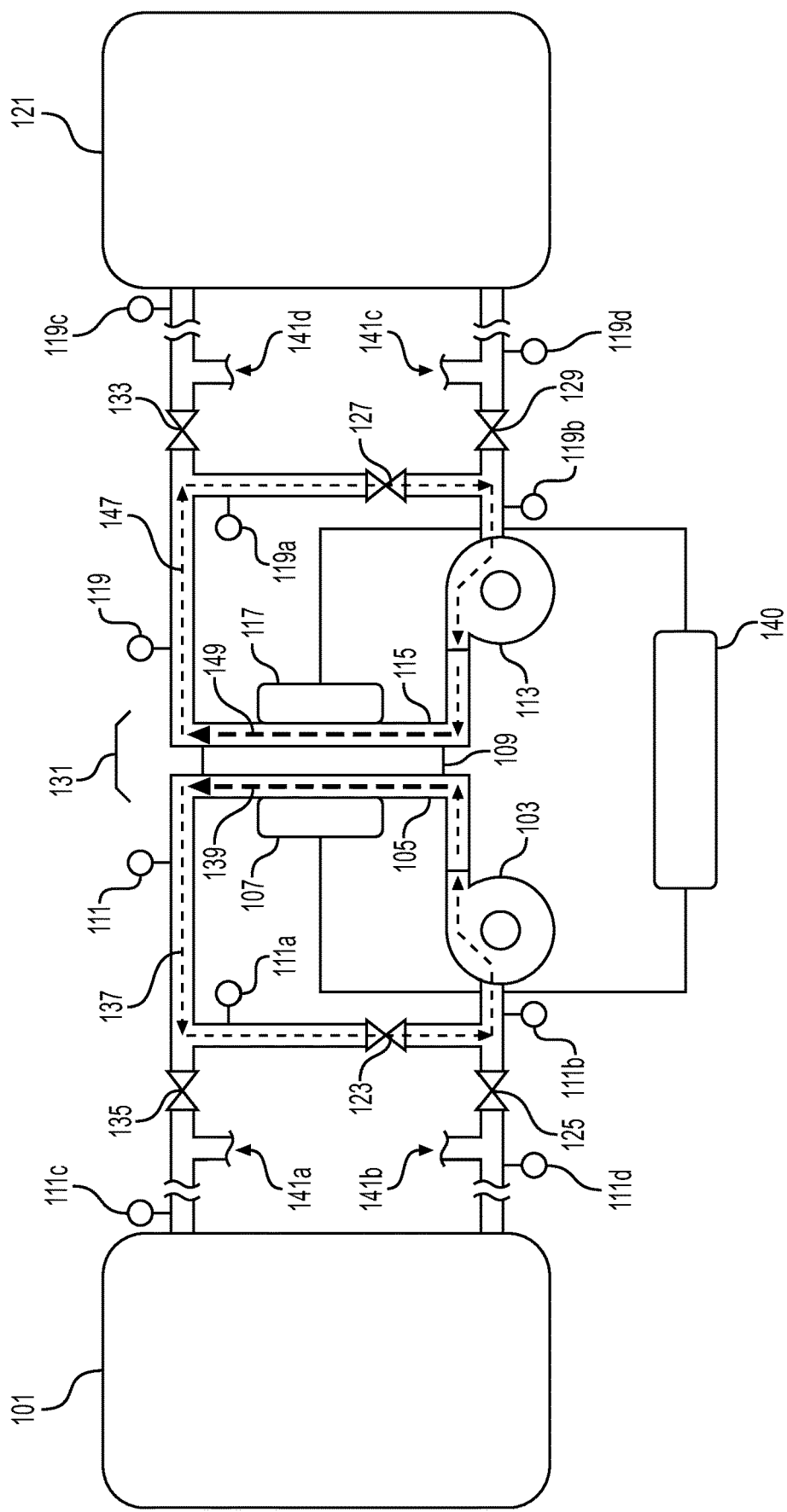
FIG. 5 depicts the flow battery of FIG. 4, identifying the fluidic train and electrode region and additional instruments.

FIG. 5 provides a view of the exemplary flow battery of the present disclosure shown in FIG. 2 with additional instruments shown. In FIG. 5, an exemplary first fluidic train 137 is shown by a dashed line. The fluidic train 137 with a first electrode region 139 shown by a heavy dashed line constitute a diagnostic subflow structure of the present disclosure. The term "electrode region" refers to the region of flow and subflow structures that carry electrolyte and is disposed within a given half-cell of the electrochemical cell. One can determine the volume of the fluidic train as well as the volume of the electrode region. By way of example, the instruments of a first dynamic fluidic network may be within the first fluidic train 137 (e.g., 111, 111a, 111b), outside the first fluidic train 137 (e.g., 111c, 111d), or both. Similarly, the instruments of a second dynamic fluidic network may be within the second fluidic train 147 (e.g., 119, 119a, 119b), outside the second fluidic train 147 (e.g., 119c, 119d), or both.

As shown in FIGS. 2-10, a flow battery can include one or more valves (123, 125, 127, 129, 133, 135, 145, 146, 155, and 156) or other modalities that can be actuated to restrict and/or redirect electrolyte flow within the flow battery. As an example, a user could close valves 135 and 125 so as to interrupt fluid communication from the larger dynamic fluidic network and include tank 101 to electrochemical cell 131. Likewise, a user can close valves 129 and 133 so as to interrupt fluid communication from the larger dynamic fluidic network and tank 121 to electrochemical cell 131. Structures 141a, 141b, 141c, and 141d of FIGS. 2-7 represent additional flow and subflow structures, such as a counterflow structure, present in the dynamic fluidic network of the flow battery. The placements of these structures in these Figures are not intended to show either relative or absolute placement thereof. Rather, they show conceptually that one or more flow and subflow structures direct electrolyte to other aspects of the dynamic fluidic network. For example, a flow battery can include flow structures with one or more valves or other modalities that can be actuated to permit electrolyte flow, such as to relieve pressure buildup within the dynamic fluidic network or to relieve a voltage buildup within the dynamic fluidic network.

Figure 3:
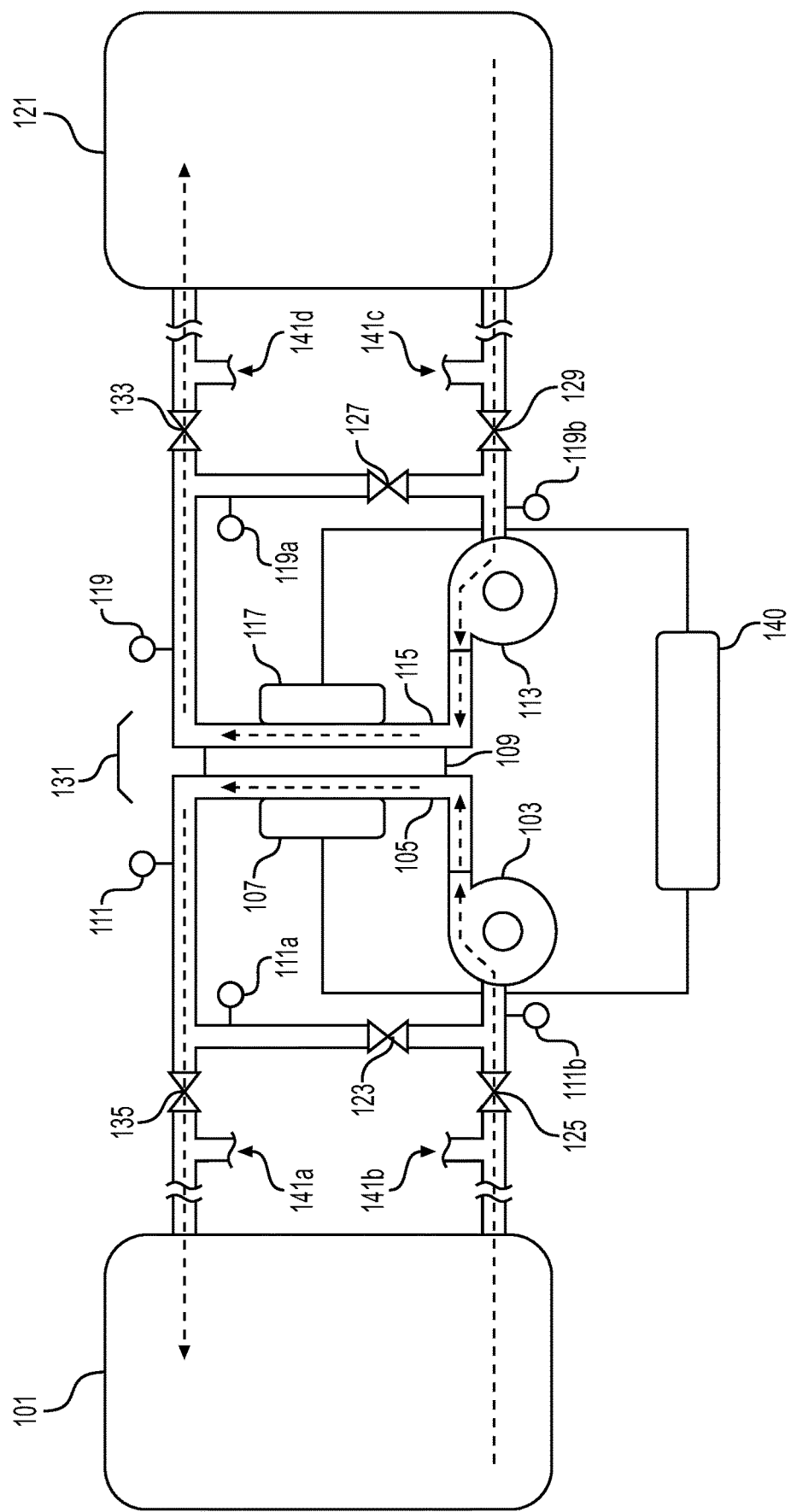
FIG. 3 depicts the flow battery of FIG. 2 with a fluidic train in state 1.

FIG. 3 provides a view of the exemplary flow battery of the present disclosure shown in FIG. 2 when the fluidic train is in a state where tanks 101 and 121 are in fluid communication with the dynamic fluidic network and the electrochemical cell 131. This state can be effected by, e.g., opening valves 125, 135, 129, and 133. Valves 123 and 127 can be closed in this state, although this is not a requirement.

It should be understood that a flow battery can be changed from one state to another in a manual fashion (e.g., via control of one or more valves), but this can also be accomplished in an automated fashion. As one non-limiting example, one or more processors can be configured to actuate one or more valves in an automated fashion so as to place a fluidic train of a flow battery into a first state. One or more processors can also be configured to actuate one or more valves in an automated fashion so as to place a fluidic train of a flow battery into a second state.

A fluidic train of a flow battery can be converted from one state to another according to a predetermined schedule or to respond to different characteristics that may be measured. As an example, the fluidic train can be converted from a state (by reference to FIG. 3) in which both tanks 101 and 121 are in fluid communication with the electrochemical cell 131 ("state 1") to a state (by reference to FIG. 4) in which tanks 101 and 121 are in fluid isolation from the electrochemical cell 131 ("state 2"). The conversion from state 1 to state 2 can be according to a predetermined schedule, e.g., every 6 hours, or as part of a measurement-based control step that may affect flow and subflow. The conversion from state 1 to state 2 can also be in response to one or more signals received from an instrument of the flow battery, e.g., if the instrument detects a signal indicative that an electrolyte has a pH that is below a certain threshold value and/or a temperature above a certain threshold value. Similarly, the battery can convert from state 2 to state 1 when one or more received signals are indicative that a characteristic of the electrolyte has returned to a predetermined value or range. The present disclosure thus includes methods in which the fluidic train of a flow battery is converted between a first state and a second state, the first state giving rise to a fluidic stream that places electrolyte in one or more electrolyte sources in fluid communication with an electrochemical cell and the second state that places the one or more electrolyte sources in fluid isolation from the electrochemical cell.

Figure 4:
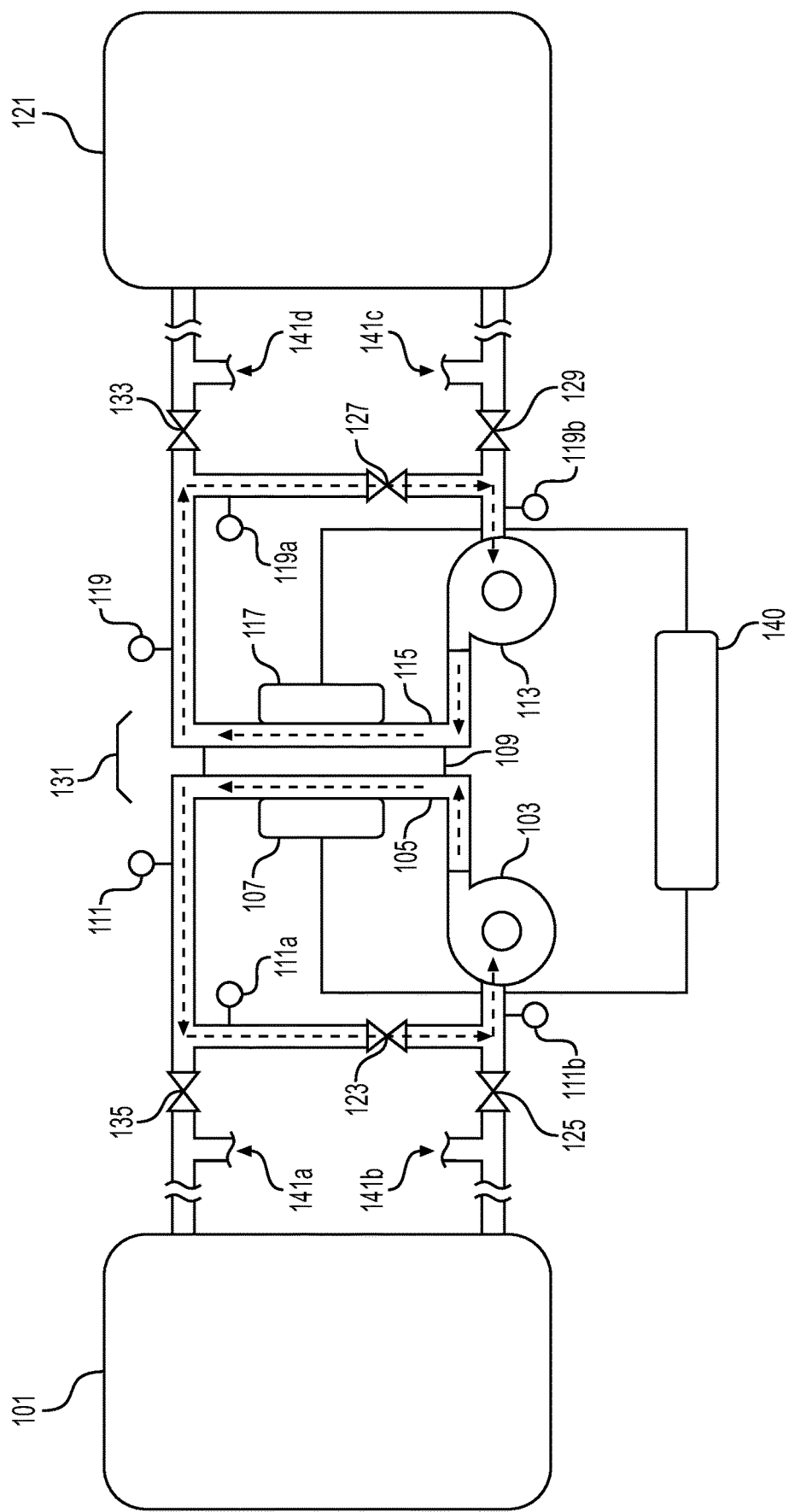
FIG. 4 depicts the flow battery of FIG. 2 with a fluidic train in state 2.

As a non-limiting example, a user can charge the active material of the electrolyte to 80% of the active material's maximum charge. If the user, however, does not desire to deliver full power immediately, the user can switch from state 1 (FIG. 3) to state 2 (FIG. 4). In this way, the charge state of the electrolyte within the relatively smaller state 2 flow stream decreases as the active material in that electrolyte is discharged, but the charge state of the active material contained within the relatively larger main electrolyte sources (which are in fluid isolation from the electrochemical cell) remains at 80%.

Similarly, (and again by reference to FIG. 3 and FIG. 4) a user can elect to maintain state 2 and charge the active material of the electrolyte in the relatively smaller state 2 fluidic train and electrode region while the main electrolyte sources are in fluid isolation from the electrochemical cell. In this manner, if a user desires to maintain the active material in the electrolyte of the main electrolyte sources at a relatively lower state of charge as compared to the active material of the electrolyte within the relatively smaller state 2 fluidic train and electrode region, the user can do so. In addition, one tank (main electrolyte source) can remain in fluid communication with the electrochemical cell(s), while the other tank (main electrolyte source) is removed from fluid communication and the fluidic train associated with that other tank is placed into fluid communication with the electrochemical cell(s). This allows a first electrolyte in a first fluidic train and a first electrode region of the electrochemical cell to cycle through its full SOC without changing the SOC of (i) the electrolyte in a first tank and remaining portions of a first dynamic fluidic network and/or (ii) a second electrolyte going through a second tank that remains in fluid communication with the electrochemical cell. This is useful for, e.g., assessing performance of one electrolyte or for mapping ORP to SOC through a full range without encountering or hitting limitations from the other electrolyte. Also as described herein, if one has to do maintenance on the system, the presence of the fluidic train allows local draining of the portions of the battery, without having to drain one or more of the main electrolyte sources (tanks).

As shown in FIG. 3, instrument 111 can be placed so as to monitor electrolyte leaving from the electrochemical cell 131 to the dynamic fluidic network and tank 101. Instrument 111b can also be placed to as to monitor electrolyte that is leaving from tank 101 toward electrochemical cell 131. Likewise, instrument 119 can be placed to as to monitor electrolyte leaving from the electrochemical cell 131 to the dynamic fluidic network and tank 121. Instrument 119b can be placed so as to monitor electrolyte that is leaving from tank 121 toward electrochemical cell 131.

Instrument 111a can be placed so as to monitor electrolyte in the fluidic train and electrode region that is in fluid isolation from tank 101. By reference to FIG. 3, such a sensor can be placed, e.g., proximate to valve 123. Similarly, instrument 119a can be placed so as to monitor electrolyte in the fluidic train and electrode region that is in fluid isolation from tank 121. By reference to FIG. 3, such a sensor can be placed, e.g., proximate to valve 127.

A person skilled in the art would appreciate that in certain aspects the first fluidic train in state 1 may comprise a pump configured to remove the first electrolyte from the first electrode region, such as during a shutdown. Similarly, a person skilled in the art would appreciate that in certain aspects the pump may also be configured to return the first electrolyte to the first electrode region, such as during a startup. In lieu of such a pump (a hydraulic system), an electrode region may be dewetted (electrolyte removed from the region) by way of a pneumatic system using forced gas (air, inert gas, such as nitrogen). A dewetted electrode region is described as "state 3" hereinbelow.

Figure 6:
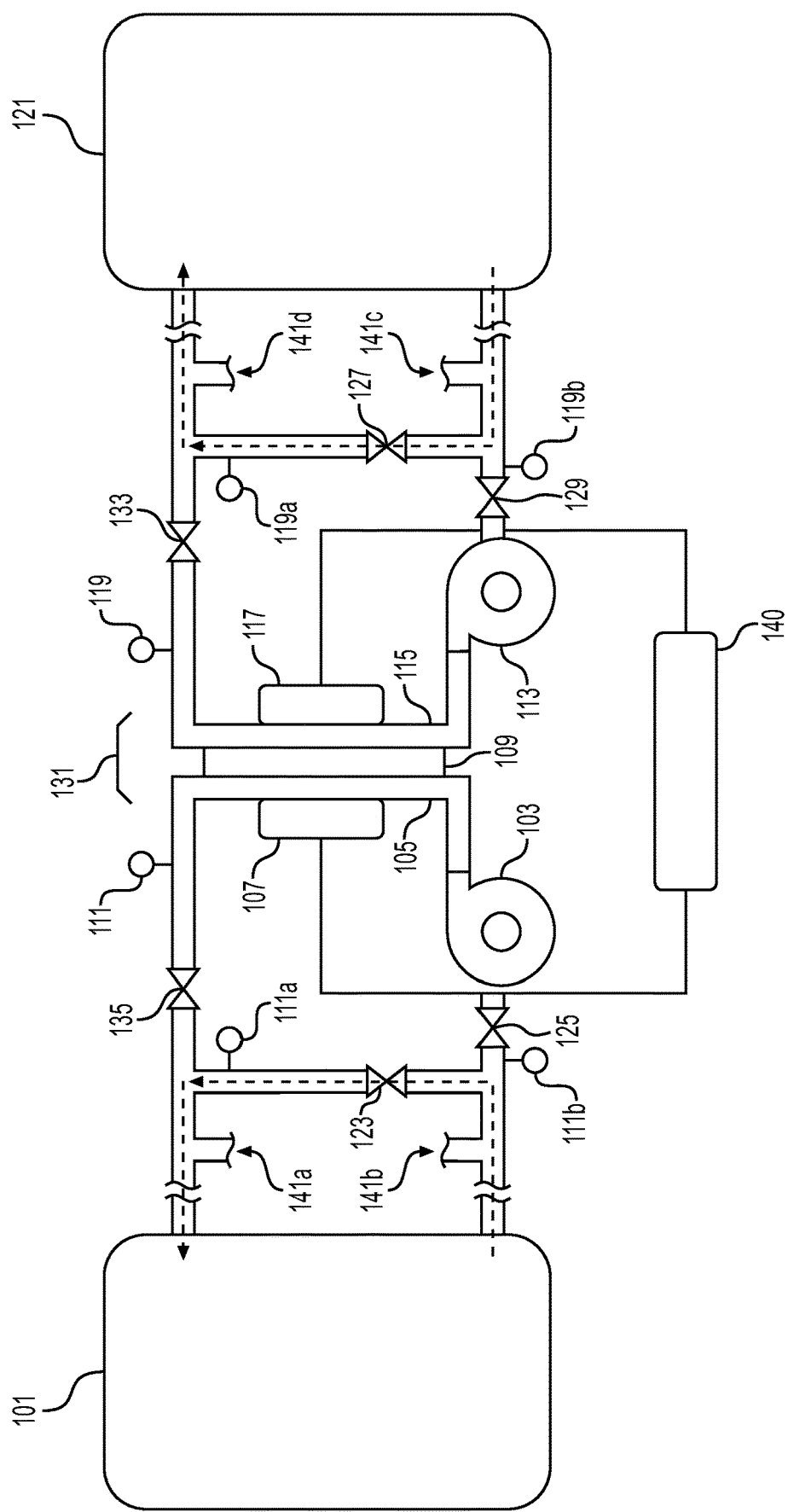
FIG. 6 depicts a general schematic of a flow battery having an exemplary dynamic fluidic network system according to a third aspect of the present disclosure.

It should be understood that FIG. 3 is illustrative only and that the positions (absolute and relative) of the various elements within that figure need not be exactly as shown in the figure. For example, as shown in FIG. 6, which is an exemplary flow battery of the present disclosure, valve 135 and valve 125 can be placed such that when they are closed (and valve 123 is open), a different fluidic train is formed whereby tank 101 is in fluid isolation from electrochemical cell 131 but electrolyte that exits tank 101 traverses a dynamic fluidic network by way of its fluidic train and then re-enters tank 101 without also passing through electrochemical cell 131. FIG. 6 is representative only, and is not necessarily to scale, and does not show all flow, subflow, or other structures, but rather shows representative structures, which serve to illustrate one potential setup of the flow battery as a whole Likewise (and as shown in FIG. 6), valve 133 and valve 129 can be placed such that when they are closed (and valve 127 is open), a different fluidic train is formed whereby tank 121 is in fluid isolation from electrochemical cell 131 but electrolyte that exits tank 121 traverses a dynamic fluidic network by way of its fluidic train and then re-enters tank 121 without also passing through electrochemical cell 131.

FIG. 4 provides a view of the exemplary flow battery of the present disclosure shown in FIG. 2 in a state where tank 101 is not in fluid communication with electrochemical cell 131. This state can be effected by closing valves 125 and 135; valve 123 can be open in this state. This state defines a subflow structure including a fluidic train in which the electrochemical cell 131 is not in fluid communication with tank 101. In this way, a user can assess a condition of the electrolyte in a portion of the flow battery without that electrolyte being returned to the larger dynamic fluidic network and tank 101. As shown in FIG. 4, a flow battery can be placed in a state in which tank 121 is not in fluid communication with electrochemical cell 131. In such a state, valves 133 and 129 are closed, while valve 127 can be open. A flow battery can be in a state in which either one or both of tanks 101 and 121 is in fluid isolation from electrochemical cell 131. A person skilled in the art would appreciate that in certain aspects the first fluidic train may comprise a pump configured to remove the first electrolyte from the first electrode region, such as during a shutdown. Similarly, a person skilled in the art would appreciate that in certain aspects the pump may also be configured to return the first electrolyte to the first electrode region, such as during a startup.

When a fluidic train is in state 2 (by reference to FIG. 4), the fluidic train may comprise (i) one or more instruments configured to determine a characteristic of the respective electrolyte disposed within the respective sampling segment, (ii) one or more instruments configured to determine a characteristic of respective electrolyte that is not disposed within the respective sampling segment, or both (i) and (ii). By way of example, the first sampling segment may be coterminous with instrument 111a, which is configured to determine a characteristic of the first electrolyte disposed within the first sampling segment, and instrument 111 is configured to determine a characteristic of first electrolyte that is not disposed within the first sampling segment.

By way of another example, the second sampling segment may be coterminous with instrument 119, which is configured to determine a characteristic of the second electrolyte disposed within the first sampling segment, with no instrument configured to determine a characteristic of the second electrolyte that is not disposed within the second sampling segment. In certain aspects, the flow battery of the present disclosure may be configured to effect an action in response to a determined characteristic of first electrolyte that is in fluid communication with the first electrode region while the first fluidic train is in the second state. In certain aspects, exemplary characteristics include pressure, conductivity, color, temperature, turbidity, viscosity, ground-reference potential, density, concentration, water activity, oxidation-reduction potential (ORP), pH, state of charge, and combinations thereof.

A non-limiting exemplary operation will be described, by reference to FIG. 2. During normal operation, valve 125 is open, and pump 103 effects transport of a first electrolyte from tank 101 through a first dynamic fluidic network to electrode 107 within electrochemical cell 131. Instrument 111b can monitor a condition of the first electrolyte, including its active material. Similarly, pump 113 effects transport of a second electrolyte from tank 121 into the first dynamic fluidic network and to electrode 117 of electrochemical cell 131.

Ion exchange takes place at separator 109, while the two electrolytes circulate through their respective electrode regions of their respective dynamic fluidic networks. Electric current that accompanies the ion exchange then powers load 140. Alternatively, load 140 can provide an electric current to electrodes 107 and 117 so as to charge the flow battery.

The first electrolyte (that was transported to the electrochemical cell 131 by pump 103) then exits the electrochemical cell 131 in the direction of valve 135. Instrument 111 can monitor a condition of the first electrolyte, including its active material, that is leaving the electrochemical cell 131. If valve 135 is open, the first electrolyte is returned to tank 101 by way of the first dynamic fluidic network.

During normal operation, valve 129 can be open, and pump 113 effects transport of a second electrolyte from tank 121 into a second dynamic fluidic network and to electrode 117, within electrochemical cell 131. Instrument 119 can monitor a condition of the second electrolyte, including its active material. The second electrolyte (that was transported to the electrochemical cell 131 by pump 113) then exits the electrochemical cell 131 in the direction of valve 133. Instrument 119 can monitor a condition of the second electrolyte, including its active material, that is leaving the electrochemical cell 131. If valve 133 is open, the second electrolyte is returned by way of the second dynamic fluidic network to tank 101.

A user, however, can close certain valves so as to allow for flow battery diagnostics/maintenance without needing to draw and return electrolyte from tanks 101 and 121. As an example, a user can close valves 135 and 125 and open valve 123. In such a configuration, the first electrolyte can circulate within a subflow structure that includes the electrochemical cell but does not include the remainder of the first dynamic fluidic network and tank 101. This in turn allows a user to perform diagnostics on the electrochemical cell 131 without involving electrolyte actively drawn from tank 101. Such diagnostics can be performed by, e.g., sensor 111, sensor, 111a, and/or sensor 111b. This can also allow a user to operate the flow battery (for a time) without involving electrolyte actively drawn from tank 101, which in turn allows the user to perform maintenance on the tank 101 while the system is operating. Conversely, by fluidically isolating the tank 101, a user can perform maintenance on the electrochemical cell 131 without having to drain the tank 101 or the portions of the dynamic fluidic network, as the tank 101 will be in fluid isolation from the electrochemical cell 131.

It should be understood that a flow battery can be operated when in the state shown in FIG. 4. In such a state, one or both of tanks 101 and 121 are in fluid isolation from electrochemical cell 131. In this manner, a flow battery can be operated without one or more main electrolyte sources with a first electrolyte being in fluid communication with the electrochemical cell. In this way, an operator can perform diagnostics on one or more tanks or regions within the dynamic fluid network while the system continues to operate.

By reference to FIG. 5, the first electrode region 139 is the region of flow and subflow structures that is within the side of electrochemical cell 131 through which the first electrolyte passes. One can also determine the enclosed volume of the first electrode region 139 as well as the enclosed volume of the first fluidic train 137. In some aspects, the first fluidic train 137 is defined as the subflow structure of the first dynamic fluidic network that carries electrolyte and that is superposed by the electrode. One can compare the combined enclosed volume of the first fluidic train 137 and the first electrode region 139 (which combined can be termed a first diagnostic subflow structure enclosed volume) to the enclosed volume of the first tank 101 or to the first dynamic fluidic network without the first fluidic train 137 and first electrode region 139. In certain aspects, the combined enclosed volume of the first fluidic train 137 and the first electrode region 139 can define an enclosed volume that is less than or equal to the enclosed volume of the first tank 101, e.g., by a factor of 0.9 (i.e., that the volume of the first fluidic train 137 and the first electrode region 139 is 90% of the volume of the first tank 101), 0.8, 0.7, 0.6, 0.5, 0.4, 0.3, 0.2, 0.1, 0.05, 0.01, or even 0.001, along with all intermediate values and ranges. Alternatively, a ratio of the enclosed volume of the first fluidic train and the enclosed volume of the first main electrolyte source is from about 1:100,000 to about 1:1, e.g., from about 1:100,000 to about 1:1, from about 1:50,000 to about 1:1, from about 1:25,000 to about 1:1, from about 1:15,000 to about 1:1, from about 1:5,000 to about 1:1, from about 1:1,000 to about 1:1, from about 1:500 to about 1:1, from about 1:250 to about 1:1, from about 1:100 to about 1:1, from about 1:50 to about 1:1, from about 1:10 to about 1:1, from about 1:5 to about 1:1.

In certain aspects, a ratio of the enclosed volume of the first electrode region and the enclosed volume of the first fluidic train is from about 1:1000 to about 1:1, e.g., from about 1:1000 to about 1:1, from about 1:750 to about 1:1, from about 1:500 to about 1:1, from about 1:250 to about 1:1, from about 1:100 to about 1:1, from about 1:50 to about 1:1, from about 1:25 to about 1:1, from about 1:10 to about 1:1, or from about 1:5 to about 1:1. In one aspect, the ratio of the enclosed volume of the first electrode region and the enclosed volume of the first fluidic train is from about 0.95:1.05 to about 0.90:1.10.

As shown in FIG. 5, a second fluidic train 147 is shown by a dashed line, with a second electrode region 149 shown by a heavy dashed line. The second electrode region 149 is the region of flow and subflow structures that is within the side of electrochemical cell 131 through which the second electrolyte passes. One can determine the enclosed volume of the second fluidic train 147 as well as the enclosed volume of the second electrode region 149. One can compare the combined enclosed volume (which can be termed a second diagnostic subflow structure enclosed volume) of the second fluidic train 147 and the second electrode region 149 to the enclosed volume of the second tank 121. As described elsewhere, the combined enclosed volume of the second fluidic train 147 and the second electrode region 149 can define an enclosed volume that is less than the enclosed volume of the second tank 121, e.g., by a factor of 0.9 (i.e., that the enclosed volume of the second fluidic train 147 and the second electrode region 149 is 90% of the enclosed volume of the second tank 121), 0.8, 0.7, 0.6, 0.5, 0.4, 0.3, 0.2, 0.1, 0.05, 0.01, or even 0.001, along with all intermediate values and ranges. Alternatively, a ratio of the enclosed volume of the second fluidic train and the enclosed volume of the second main electrolyte source is from about 1:100,000 to about 1:1, e.g., from about 1:100,000 to about 1:1, from about 1:50,000 to about 1:1, from about 1:25,000 to about 1:1, from about 1:15,000 to about 1:1, from about 1:5,000 to about 1:1, from about 1:1,000 to about 1:1, from about 1:500 to about 1:1, from about 1:250 to about 1:1, from about 1:100 to about 1:1, from about 1:50 to about 1:1, from about 1:10 to about 1:1, from about 1:5 to about 1:1.

In certain aspects, a ratio of the enclosed volume of the second electrode region and the enclosed volume of the second fluidic train is from about 1:1000 to about 1:1, e.g., from about 1:1000 to about 1:1, from about 1:750 to about 1:1, from about 1:500 to about 1:1, from about 1:250 to about 1:1, from about 1:100 to about 1:1, from about 1:50 to about 1:1, from about 1:25 to about 1:1, from about 1:10 to about 1:1, or from about 1:5 to about 1:1. In one aspect, the ratio of the enclosed volume of the second electrode region and the enclosed volume of the second fluidic train is from about 0.95:1.05 to about 0.90:1.10.

The sum of a fluidic train enclosed volume and an electrode region enclosed volume is therefore an enclosed volume of a particular diagnostic subflow structure.

By reference to non-limiting FIG. 5, one sampling segment is the location within the first fluidic train 137 that is superposed by instrument 111. Another sampling segment of the first fluidic train 137 is the location within the first fluidic train that is superposed by instrument 111*a*.

Figure 7:
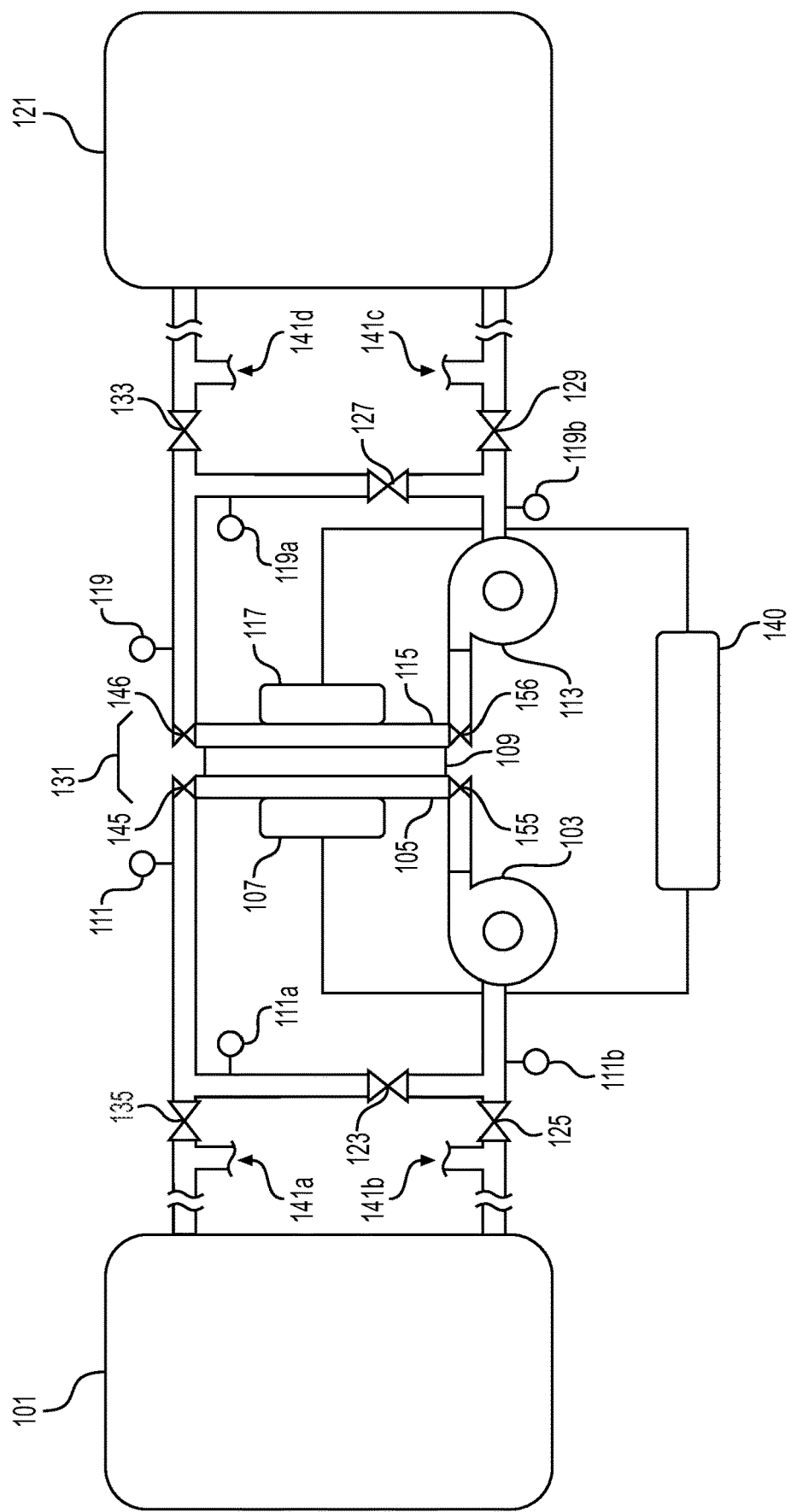
FIG. 7 depicts a general schematic of a flow battery having an exemplary dynamic fluidic network system according to a fourth aspect of the present disclosure with a fluidic train in a third state.

FIG. 7 provides a view of an exemplary flow battery of the present disclosure with a fluidic train in a third state where an electrode region is in fluid isolation from the remainder of its respective dynamic fluidic network and tank. For example, this state can be effected by closing valves 145 and 155; valves 123, 125, and/or 135 can be open in this state. The first electrode region is thereby in fluid isolation from the remainder of the first dynamic fluidic network, including the first fluidic train, and tank 101. In this way, a user can de-energize the electrochemical cell 131 without affecting the flow battery or flow battery system as a whole. As shown in FIG. 7, a flow battery can be placed in a state in which the second electrode region within flow plate 115 is in fluid isolation from the remainder of the second dynamic fluidic network, including the second fluidic train, and tank 121. In such a state, valves 146 and 156 are closed and valves 127, 129, and/or 133 can be open. A flow battery can be in a state in which either one or both of electrode regions 139 and 149 is in fluid isolation from remainder of the battery. Also as described herein, if one has to do maintenance on the system, the presence of the fluidic train in the third state also allows local draining of the electrode region, without having to drain other portions of the flow battery. FIG. 7 is representative only, is not necessarily to scale, and does not show all flow, subflow, or other structures, but rather shows representative structures, which serve to illustrate one potential setup of the flow battery as a whole.

It should be understood that the attached figures depict specific but non-limiting aspects of a flow battery. Accordingly, flow batteries and flow battery systems according to the present disclosure can include some or even all of the aspects of the flow batteries depicted in FIGS. 1-12.

In some cases, a user may desire to provide higher charge or discharge voltages than available from a single battery. In such cases, and in certain aspects then, several batteries are connected in series such that the voltage of each electrochemical cell is additive. An electrically conductive, but non-porous material (e.g., a bipolar plate assembly) can be employed to connect adjacent electrochemical cells in a bipolar stack, which allows for electron transport but prevents fluid or gas transport between adjacent electrochemical cells. The positive electrode compartments and negative electrode compartments of individual electrochemical cells are suitably fluidically connected via common positive and negative fluid manifolds in the stack. In this way, individual electrochemical cells can be stacked in series to yield a desired operational voltage. Multiple electrochemical cells electrically connected to each other in series are referred to as a "stack" in this disclosure.

In some cases, a user may desire to provide a better current performance than available from a single battery. In such cases, and in certain aspects, several batteries may be connected in parallel.

In additional aspects, the cells, cell stacks, or batteries can be incorporated into larger energy storage and generation systems, suitably including piping and controls useful for operation of these large units. Piping, control, and other equipment suitable for such systems are known in the art, and include, for example, piping and pumps in fluid communication with one or more components of the flow battery, such as for moving electrolytes into and out of the electrochemical cells and main electrolyte sources, utilizing storage tanks for holding charged and discharged electrolytes. The energy storage and generation systems that include the flow batteries described by the present disclosure can include further electrolyte circulation streams, which may comprise one or more valves, one or more pumps, and optionally a pressure equalizing line. The energy storage and generation systems that include the flow batteries of this disclosure can also include an operation management system. The operation management system may be any suitable controller device, such as a computer or microprocessor, and may contain logic circuitry that sets operation of any of the various valves, pumps, flow and subflow structures, and the like.

In some aspects, a flow battery system comprises a flow battery (including main electrolyte source(s), electrochemical cell(s), and a dynamic fluidic network system); storage tanks and piping for containing and transporting the electrolytes to and from the flow battery; control hardware and software (which may include safety systems); and a power conditioning unit. The flow battery's electrochemical cell(s) accomplishes the conversion of charging and discharging cycles and determines the peak power of energy storage system, which power may in some aspects be in the kW range.

The (main) electrolyte sources and storage tanks contain the electrolytes with the positive and negative active materials. The electrolyte source volumes and the concentrations of active materials determine the quantity of energy stored in the flow battery, which may be measured in kWh. The flow battery of the present disclosure comprises a first main electrolyte source configured to contain a positive electrolyte and a second main electrolyte source configured to contain a negative electrolyte. In certain aspects, it is contemplated that there may be additional electrolyte sources containing positive or negative electrolyte.

Control software, hardware, and optional safety systems suitably include instruments, mitigation equipment and other electronic/hardware controls and safeguards to ensure safe, autonomous, and efficient operation of the flow battery and flow battery system. As described herein, these may be placed in various locations throughout the dynamic fluidic network system, or other locations of the flow battery system. Such control software, hardware, and optional safety systems are known to those of ordinary skill in the art. Exemplary hardware may include a control center with monitors displaying real-time information from the instruments, and configured with an optional alarm or detection system, to identify when a certain property exceeded acceptable control limits.

A power conditioning unit may be used at the front end of the flow battery system to convert incoming and outgoing power to a voltage and current that is optimal for the flow battery system or the application. For the example of a flow battery connected to an electrical grid, in a charging cycle the power conditioning unit would convert incoming AC electricity into DC electricity at an appropriate voltage and current for the electrochemical cell(s). In a discharging cycle, the electrochemical cells(s) produce DC electrical power and the power conditioning unit converts to AC electrical power at the appropriate voltage and frequency for grid applications.

Referring again to FIG. 1, a subregion of a dynamic fluid network is shown in which electrolyte is delivered to half-cells of two electrochemical cell(s). In this depiction, a subflow structure 4 having $V_4$, $A_4$ delivers electrolyte to subflow structures 6, 7 branched in parallel to deliver the electrolyte to multiple cells, and these structures have $V_6$, $A_6$ and $V_7$, $A_7$, respectively. These subflow structures feed the electrolyte to manifolds on a surface of a bipolar plate assembly (BPPA) or a surface of a monopolar plate assembly (MPPA), which "n" manifolds have their own volumes ("$V_n$") and cross-sectional areas ("$A_n$"), and these supply electrolyte to flow channels in the corresponding surface of the flow plate, whether BPPA or MPPA.

Figure 11:
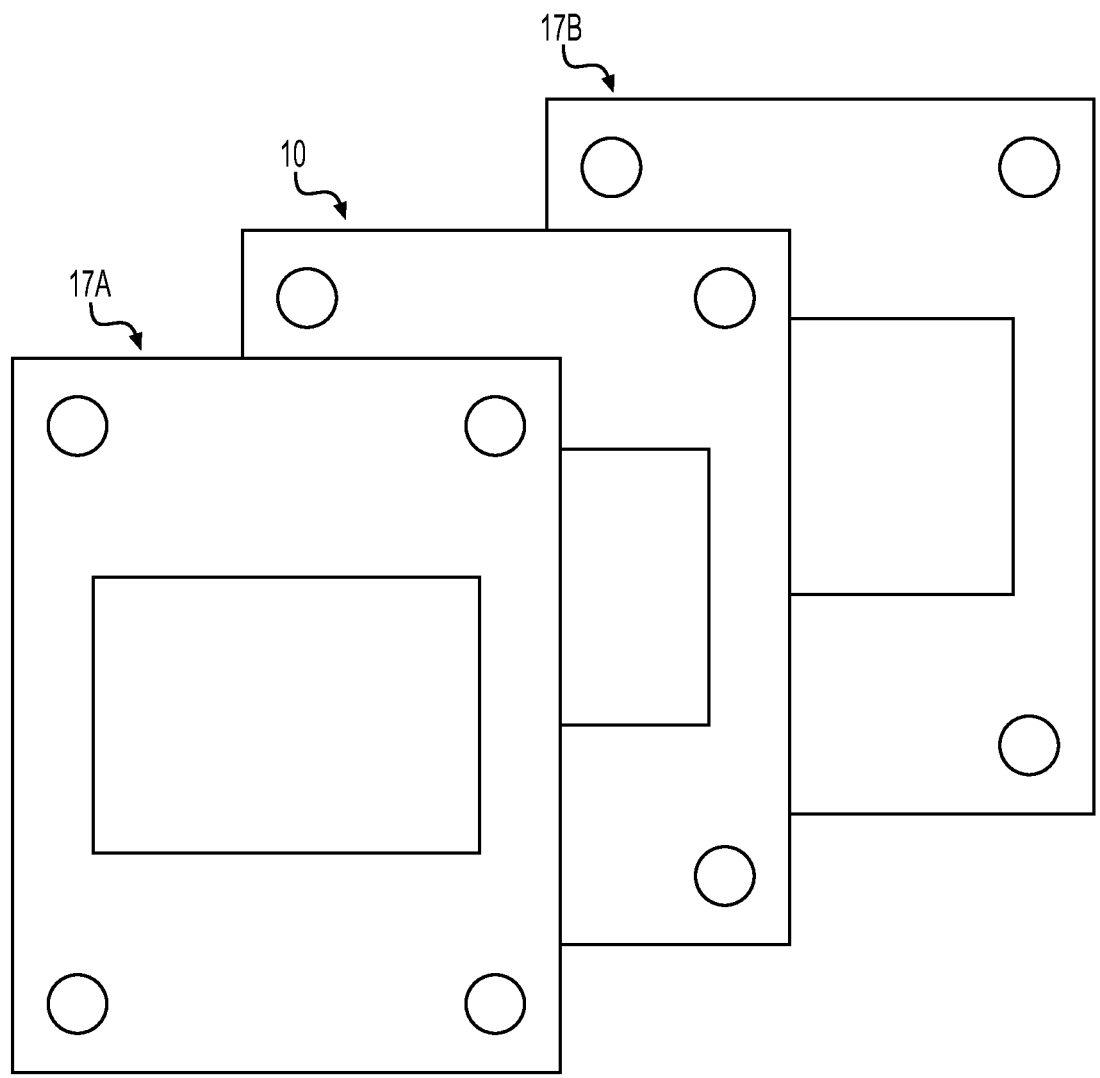
FIG. 11 depicts exemplary monopolar and bipolar plate assemblies according to the present disclosure.

A BPPA has a frame and an inner plate on positive and negative sides of the BPPA. Similarly, a MPPA has a frame and an inner plate on one side. The frame and inner plate may be made of different materials that are joined together, are substantially coplanar, and form an integral, unitary structure. Exemplary BPPA and MPPA structures are depicted in FIG. 11 with exemplary flow structures for the BPPA depicted in FIG. 12. Shown are structures comprising an integrated assembly of a frame 10 and a structure (e.g., an inner plate) within the frame (flow and subflow structures comprising a single overall flow structure in a MPPA or on either side of a BPPA). The frame 10 has various flow and subflow structures of the dynamic fluidic network system, including inlet and outlet conduits 11 for conveying electrolytes through multiple electrochemical cells in a stack, and an inlet (source) manifold 12 on each side of the bipolar plate (a single side of a monopolar plate) to deliver first and second electrolytes to their corresponding inlet (source) flow structures 14 of the inner plate, and outlet (drain) manifolds 13 on each side of the bipolar plate (a single side of a monopolar plate) to drain reacted electrolyte from outlet (drain) flow structures 14 of the inner plate. Each side of the bipolar plate (and the single side of a monopolar plate) has inlet (source) manifolds 12 on one edge and outlet (drain) manifolds 13 on a second edge. The inlet and outlet conduits 11 communicate fluidically with their respective inlet and outlet manifolds 12, 13, which fluidically communicate with their respective inlet and outlet flow structures 14 of the inner plate. In some aspects, the inlet and outlet manifolds 12, 13 may have holes that communicate fluidically with one or more inlet and outlet flow structures of the inner plate, respectively.

Figure 12:
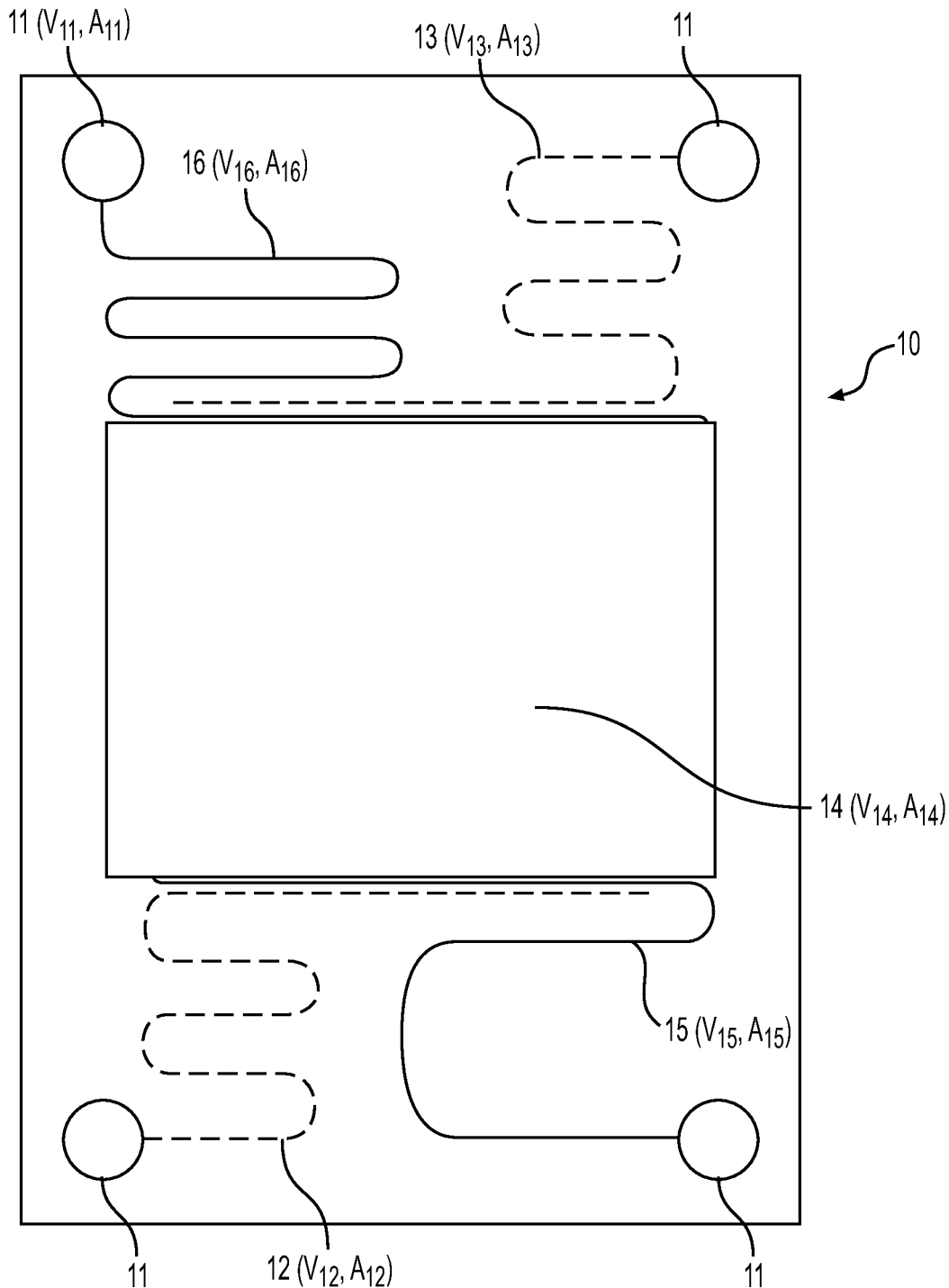
FIG. 12 depicts exemplary features of the bipolar plate assembly of FIG. 11.

The design and orientation of these flow structures and subflow structures may be selected to achieve various desired functions, including improved electrolyte flow. FIGS. 11 and 12 are not necessary to scale, and do not show all flow, subflow, or other structures, but rather shows representative structures, which serve to illustrate one potential setup of a plate assembly of the flow battery. The geometries and other architectural features of plate structures shown in FIGS. 11 and 12 are not limiting, and geometrical forms, and placing and spacing of components, may be selected to achieve particular objectives.

Each of "n" flow structures and subflow structures leading to and within the BPPA or MPPA has its own volume ("$V_n$") and cross-sectional area ("$A_n$"), as depicted in FIGS. 11 and 12. The typical relationship of these inlet (source) structures is: $V_4 > V_6$ or $V_7 > V_{11} > V_{12} \gg V_{14}$ with the same progression and relationships for the $A_n$ values. Although not fully shown in FIGS. 11 and 12, these inlet (source) structures will have correlative outlet (drain) structures, typically on an opposite edge of a BPPA (or MPPA), having $V_n$ and $A_n$ values with a progression and relationships that will generally be the reverse of those for the correlative inlet structures, in that those V and A values will go from smallest to progressively larger.

BPPAs and MPPAs may have flow structures with subflow structures such as inlet and outlet conduits, inlet and outlet manifolds, and inlet and outlet flow structures serving each side of a BPPA (or the single side of an MPPA). The design of these flow structures and their subflow structures may vary depending on the needs of a particular flow battery and flow battery system and even as between different types of electrolyte solutions. For example, the $V_n$ and $A_n$ values for a manifold as well as its shape and length may be designed for flow dynamic results and also to help manage shunt currents in a battery or stack by making the manifold structure itself more electrically resistive. In a two-electrolyte flow battery where positive and negative electrolytes are different, one electrolyte may tend to be more susceptible to shunt currents than the other electrolyte, so in this respect, manifold design for one side of a bipolar plate may be longer and narrower than a manifold on the other side of the bipolar plate. This may be applied to the inlet, outlet, or both manifolds. Flow characteristics of negative and positive electrolytes may also vary such that design of other subflow structures of the plate's flow structure may be different.

Each "n" inlet and outlet manifold has values for $V_n$, $A_n$, a length $L_n$, and a path $P_n$, such that $V_n$, $A_n$, $L_n$, and $P_n$ define a shape (path) of the manifold within a portion of the BPPA or MPPA. One or more of $V_n$, $A_n$, $L_n$, and $P_n$ values may be the same or different between inlet and outlet manifolds on the same side of the BPPA or MPPA. One or more of $V_n$, $A_n$, $L_n$, and $P_n$ values may be the same or different between inlet and outlet manifolds on different sides of the BPPA. A pathway may be elongated, such that the length of the manifold is extended beyond that necessary to link a respective conduit with inner plate flow structures, or to link a respective conduit with a structure, such as a plenum, that supplies electrolyte to inner plate flow structures. An example of an elongated pathway is an "s-curve" manifold configuration, which is understood to comprise a subflow structure that crosses the majority of the width of the plate assembly at least twice making >90 degree turns before delivering electrolytes to the corresponding inner plate subflow structure (see below). By way of example, FIG. 12 depicts the inlet and outlet manifolds 15, 16 for a first electrolyte having an elongated pathway, here depicted as a more circuitous "s-curve" or serpentine pathway, than the inlet and outlet manifolds 12, 13 for a second electrolyte. Hence, the shunt current control subflow structures (such as for shunt current mitigation and/or management), of the dynamic fluid network may comprise the manifold(s), conduits(s), and/or other subflow structures. Negative and positive flow structure designs may share many common characteristics in aspects of the disclosure. In aspects, the inner plate may be made of a conductive material, or may be a non-conductive material that is infused with conductive material, or is overlain by conductive material affixed thereto.

Each side of a BPPA and MPPA has an inner plate with a subflow structure. The inner plate subflow structures may have a variety of different patterns, on either side of a BPPA or MPPA, or may vary for different needs. The inner plate subflow structures comprise a plurality of inlet and outlet flow structures 14 that may be of any configuration or pattern known in the art, including use of reticulated flow and subflow structures. For example, the inner plate's subflow structure may have a first inlet flow structure, a second inlet flow structure, a third inlet flow structure, and a fourth inlet flow structure, which may or may not be structurally or fluidically connected to each other within the inner plate.

Similar to the inlet and outlet manifolds, each "n" inlet and outlet flow structure of a BPPA or MPPA inner plate has values for $V_n$, $A_n$, a length $L_n$, and a path $P_n$, such that $V_n$, $A_n$, $L_n$, and $P_n$ define a shape, and path, of the inner plate flow structures, and collectively, a pattern. The $V_n$, $A_n$, $L_n$, and $P_n$ values for inlet and outlet flow structures in the inner plate are independent of each other, and may be the same or different. The corresponding inner plate subflow structures of each side of a BPPA may have the same or different patterns or configurations of inlet and/or outlet flow structures. These differences between inner plate subflow structures may be throughout the inner plate subflow structure or only within sub-regions of the inner plate subflow structures. Similarly, the corresponding inner plate subflow structures of MPPAs with opposite polarity may have the same or different patterns or configurations of inlet and/or outlet flow channels.

A counterflow structure is associated with instruments (monitors, sensors, processors) that detect or measure conditions (at least one characteristic) of the electrolyte in the flow battery, which may require treatment of all or a portion of the electrolyte in the flow battery, such as with a treatment subflow structure. A non-limiting example of a treatment subflow structure is a rebalancing subflow structure. Once such need is ascertained, the volume of electrolyte to be treated may be measured or calculated, and sufficient electrolyte to achieve adequate rebalancing may be conveyed to a balancing cell, treated, and reintroduced into the battery. The volume to be treated may be all or a portion of the total volume of electrolyte in the system, such as that of the electrochemical cell(s). Given this understanding, a person of ordinary skill in the art would be able to selectively place and operate any subflow structures and valves to define the volume to be rebalanced. The counterflow structure may operate such that the flow is counter to or concurrent with the typical flow of electrolyte with the flow battery, such as from a main electrolyte source to an electrode region and back to the main electrolyte source. A counterflow structure may also be associated with a balancing cell, as described below.

Figure 8:
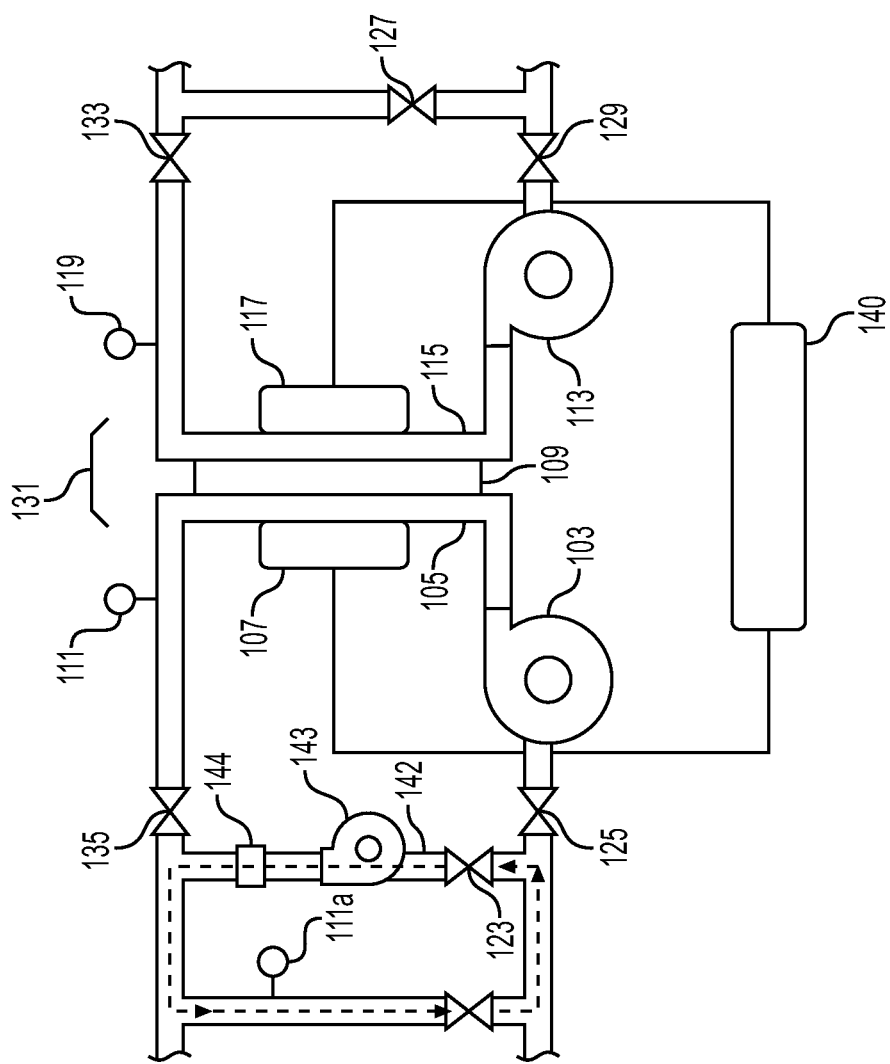
FIG. 8 depicts a general schematic of a flow battery having an exemplary dynamic fluidic network system according to a fifth aspect of the present disclosure with an exemplary counterflow structure.

FIG. 8 depicts an exemplary flow battery of the present disclosure with a counterflow structure 142 of the dynamic fluidic network. FIG. 8 is representative only, is not necessarily to scale, and does not show all flow, subflow, or other structures, but rather shows representative structures, which serve to illustrate one potential setup of the flow battery as a whole. The counterflow structure may be configured to fluidically communicate with the remainder of the dynamic fluidic network, when the electrochemical cell(s) are isolated with valves 125 and 135 closed. As shown, the counterflow structure 142 fluidically comprises a pump 143 and a balancing cell 144, and as further shown, conveys a negative electrolyte to the balancing cell for rebalancing. The counterflow structure 142 then reintroduces the treated negative electrolyte into the remainder of the dynamic fluidic network, excluding the isolated electrochemical cell 131. When the charge of the electrolyte reaches a predetermined level, valves 125 and 135 are opened, placing the electrochemical cell 131 in fluid communication with the remainder of the flow battery. Exemplary balancing cells are discussed in U.S. Patent Application Publication Nos. 2016/0233531, 2016/0308234, 2016/0308235, 2017/0317363, 2018/0277868, and 2020/0313212, which are incorporated herein by reference.

Figure 9:
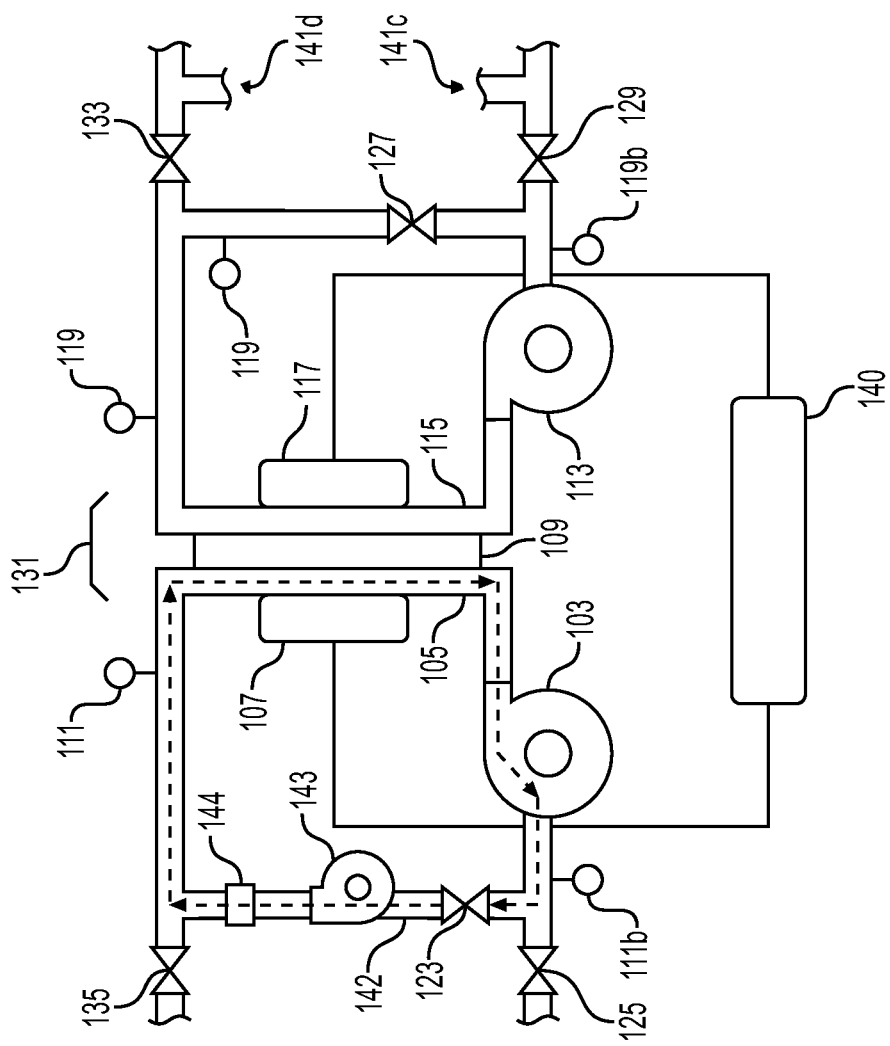
FIG. 9 depicts a general schematic of a flow battery having an exemplary dynamic fluidic network system according to a sixth aspect of the present disclosure with an exemplary counterflow structure.

In another non-limiting example of a flow battery of the present disclosure with a counterflow structure 142 of the dynamic fluidic network, described by reference to FIG. 9, instrument 111 can monitor the characteristics of the electrolyte leaving electrochemical cell 131. For example, when the charge of the electrolyte reaches a predetermined level, valves 125 and 135 are closed, isolating the electrochemical cell 131 from the remainder of the battery. Pump 143 effects transport of the electrolyte from the electrochemical cell 131 and through the balancing cell 144 and back to the electrochemical cell 131. When instrument 111, which continues to monitor the characteristics of the electrolyte, determines that the charge has reached a predetermined level, valves 125 and 135 are open such that electrochemical cell 131 is in fluid communication the remainder of the battery. FIG. 9 is representative only, is not necessarily to scale, and does not show all flow, subflow, or other structures, but rather shows representative structures, which serve to illustrate one potential setup of the flow battery as a whole.

A single counterflow structure and balancing cell are depicted in FIGS. 8 and 9, but a second electrolyte may also be rebalanced when needed. Two electrolytes may be treated simultaneously or sequentially in a single balancing cell, or optionally, a second balancing cell may be included for a second electrolyte. Two electrolytes may be balanced independently of each other. In addition, the condition or characteristic being monitored may be that of an electrolyte within a diagnostic subflow structure, outside a diagnostic subflow structure, or both. One or more counterflow structures may be incorporated into any battery or system configuration. Alternatively, flow and subflow structures in lieu of, or in addition to, a subflow structure may also be used, as further described herein.

In some aspects, the flow structures and subflow structures may be isolated flow structures and subflow structures. The isolated flow structures and subflow structures are in fluid isolation from the remainder of the dynamic fluidic network without affecting the operation of the flow battery. For example, counterflow structures, diagnostic subflow structures, and treatment subflow structures may be isolated structures and subflow structures. By way of example, an isolated treatment subflow structure can treat the electrolyte within the subflow structure while not affecting the operation of the flow battery.

The flow batteries and flow battery storage systems of the present disclosure are, in some aspects, suited to sustained charge or discharge cycles of several hour durations. As such, the batteries and systems of the present disclosure may be used to smooth energy supply/demand profiles and provide a mechanism for stabilizing intermittent power generation assets (e.g., from renewable energy sources). It should be appreciated, then, that various aspects of the present disclosure include those electrical energy storage applications where such long charge or discharge durations are valuable. For example, non-limiting examples of such applications include those where systems of the present disclosure are connected to an electrical grid include, so as to allow renewables integration, peak load shifting, grid firming, baseload power generation consumption, energy arbitrage, transmission and distribution asset deferral, weak grid support, and/or frequency regulation. Electrochemical cells, batteries, or stacks according to the present disclosure may be used to provide stable power for applications that are not connected to a grid, or a micro-grid, for example as power sources for remote camps, forward operating bases, off-grid telecommunications, or remote sensors.

It should be appreciated that, while the various aspects described herein are described in terms of flow batteries and flow battery systems, the same strategies and design may also be employed with stationary (non-flow) electrochemical cells, batteries, or systems, including those where one or both half cells employ stationary electrolytes. Each of these aspects is considered within the scope of the present invention.

Aspects

The following Aspects are illustrative only and do not serve to limit the scope of the present disclosure or the appended claims.

Aspect 1. A flow battery comprising: a dynamic fluidic network system comprising a first dynamic fluidic network and second fluidic network; wherein the flow battery has a first half and a second half, the first half comprising (i) a first main electrolyte source configured to contain a first electrolyte, (ii) a first electrode region configured for electronic communication with the first electrolyte, and (iii) the first dynamic fluidic network configured for fluid communication with the first main electrolyte source and comprising the first electrode region, a first fluidic train, and a first counterflow structure, the first fluidic train comprising a first sampling segment and the first fluidic train being convertible between a first state and a second state, the first state placing the first main electrolyte source and the first dynamic fluidic network, outside the first fluidic train and first electrode region, into fluid communication with the first electrode region, the second state placing the first main electrolyte source and the first dynamic fluidic network, outside the first fluidic train and first electrode region, into fluid isolation from the first electrode region and placing the first electrode region into fluid communication with the first sampling segment, the second half comprising (i) a second main electrolyte source configured to contain a second electrolyte, (ii), a second electrode region configured for electronic communication with the second electrolyte, and (iii) the second fluidic network configured for fluid communication with the second main electrolyte source and comprising the second electrode region and a second fluidic train, the second fluidic train configured to place the second main electrolyte source and second fluidic network, outside the second fluidic train and second electrode region, into fluid communication with the second electrode region.

Alternatively, in lieu of or in addition to the first counterflow structure, the first dynamic fluidic network may have flow structures selected from series subflow structures, parallel subflow structures, shunt current control subflow structures (such as for shunt current mitigation and/or management), measurement subflow structures, diagnostic subflow structures, treatment (such as electrolyte rebalancing) subflow structures, source subflow structures, reticulated subflow structures, drain subflow structures, and combinations thereof. The flow battery may be a redox flow battery. For clarity, the presence of a counterflow structure does not preclude inclusion of any of the flow/subflow structures described herein.

Aspect 2. The flow battery of Aspect 1, wherein the first state of the first fluidic train also places the first sampling segment into fluid communication with at least one of (i) the first main electrolyte source, (ii) the first dynamic fluidic network, outside the first fluidic train and first electrode region, and (iii) the first electrode region.

Aspect 3. The flow battery of Aspect 1 or Aspect 2, wherein the first fluidic train is convertible to a third state, the third state placing the first electrode region into fluid isolation from the first dynamic fluidic network, outside the first electrode region.

Aspect 4. The flow battery of any one of Aspects 1 to 3, wherein the second fluidic train comprises a second sampling segment, the second fluidic network is a dynamic fluidic network further comprising a second counterflow structure, and the second fluidic train is convertible between a first state and a second state, the first state of the second fluidic train placing the second main electrolyte source and the second dynamic fluidic network, outside the second fluidic train and second electrode region, into fluid communication with the second electrode region, the second state of the second fluidic train placing the second main electrolyte source and the second dynamic fluidic network, outside the second fluidic train and the second electrode region, into fluid isolation from the second electrode region and placing the second electrode region into fluid communication with the second sampling segment.

Alternatively, in lieu of or in addition to the second counterflow structure, the second dynamic fluidic network may have flow structures selected from series subflow structures, parallel subflow structures, shunt current control subflow structures (such as for shunt current mitigation and/or management), measurement subflow structures, diagnostic subflow structures, treatment (such as electrolyte rebalancing) subflow structures, source subflow structures, reticulated subflow structures, drain subflow structures, and combinations thereof. For clarity, the presence of a counterflow structure does not preclude inclusion of any of the flow/subflow structures described herein.

Aspect 5. The flow battery of Aspect 4, wherein the first state of the second fluidic train also places the second sampling segment into fluid communication with at least one of (i) the second main electrolyte source, (ii) the second dynamic fluidic network, outside the second fluidic train and second electrode region, and (iii) the second electrode region.

Aspect 6. The flow battery of Aspect 4 or Aspect 5, wherein the second fluidic train is convertible to a third state, the third state placing the second electrode region into fluid isolation from the second dynamic fluidic network, outside the second electrode region.

Aspect 7. The flow battery of any one of Aspects 1 to 6, wherein:
(a) (i) one or more instruments configured to determine a characteristic of first electrolyte disposed within the first sampling segment, (ii) one or more instruments configured to determine a characteristic of first electrolyte that is not disposed within the first sampling segment, or both (i) and (ii) are located within the first fluidic train; or
(b) instruments configured to (i) determine a characteristic of first electrolyte disposed within the first sampling segment, (ii) determine a characteristic of first electrolyte that is not disposed within the first sampling segment, or both (i) and (ii), are located outside the first fluidic train; or
(c) combinations of both (a) and (b).

Aspect 8. The flow battery of Aspect 7(a), or (b), or (c), wherein the characteristic of first electrolyte is selected from pressure, conductivity, color, temperature, turbidity, viscosity, ground-reference potential, density, concentration, water activity, oxidation-reduction potential, pH, state of charge, and combinations thereof.

Aspect 9. The flow battery of Aspect 7(a), or (b), or (c), wherein the instruments comprise both (i) and (ii) and the characteristic determined by (i) is the same as the characteristic determined by (ii).

Aspect 10. The flow battery of any one of Aspects 4 to 6, wherein:
(a) (i) one or more instruments configured to determine a characteristic of second electrolyte disposed within the second sampling segment, (ii) one or more instruments configured to determine a characteristic of second electrolyte that is not disposed within the second sampling segment, or both (i) and (ii) are located within the second fluidic train; or
(b) instruments configured to: (i) determine a characteristic of second electrolyte disposed within the second sampling segment, (ii) determine a characteristic of second electrolyte that is not disposed within the second sampling segment, or both (i) and (ii), are located outside the second fluidic train; or
(c) combinations of both (a) and (b).

Aspect 11. The flow battery of Aspect 10, wherein the characteristic of second electrolyte is selected from pressure, conductivity, color, temperature, turbidity, viscosity, ground-reference potential, density, concentration, water activity, oxidation-reduction potential, pH, state of charge, and combinations thereof.

Aspect 12. The flow battery of Aspect 10(a), or (b), or (c), wherein the instruments comprise both (i) and (ii) and the characteristic determined by (i) is the same as the characteristic determined by (ii).

Aspect 13. The flow battery of any one of Aspects 1 to 12, wherein the first electrode region has an enclosed volume, wherein the first fluidic train in its second state has an enclosed volume, and wherein the ratio of the enclosed volume of the first electrode region and the enclosed volume of the first fluidic train is from about 1:1000 to about 1:1, e.g., from about 1:1000 to about 1:1, from about 1:750 to about 1:1, from about 1:500 to about 1:1, from about 1:250 to about 1:1, from about 1:100 to about 1:1, from about 1:50 to about 1:1, from about 1:25 to about 1:1, from about 1:10 to about 1:1, or from about 1:5 to about 1:1.

Aspect 14. The flow battery of Aspect 13, wherein the ratio of the enclosed volume of the first electrode region and the enclosed volume of the first fluidic train is from about 0.95:1.05 to about 0.90:1.10.

Aspect 15. The flow battery of any one of Aspects 1 to 14, wherein the first electrolyte source has an enclosed volume, wherein the first fluidic train in its second state has an enclosed volume, and wherein the ratio of the enclosed volume of the first fluidic train and the enclosed volume of the first electrolyte source is from about 1:100,000 to about 1:1, e.g., from about 1:100,000 to about 1:1, from about 1:50,000 to about 1:1, from about 1:25,000 to about 1:1, from about 1:15,000 to about 1:1, from about 1:5,000 to about 1:1, from about 1:1,000 to about 1:1, from about 1:500 to about 1:1, from about 1:250 to about 1:1, from about 1:100 to about 1:1, from about 1:50 to about 1:1, from about 1:10 to about 1:1, from about 1:5 to about 1:11.

Aspect 16. The flow battery of any one of Aspects 1 to 15, wherein the second electrode region has an enclosed volume, wherein the second fluidic train in its second state has an enclosed volume, and wherein the ratio of the enclosed volume of the second electrode region and the enclosed volume of the second fluidic train is from about 1:1000 to about 1:1, e.g., from about 1:1000 to about 1:1, from about 1:750 to about 1:1, from about 1:500 to about 1:1, from about 1:250 to about 1:1, from about 1:100 to about 1:1, from about 1:50 to about 1:1, from about 1:25 to about 1:1, from about 1:10 to about 1:1, or from about 1:5 to about 1:1.

Aspect 17. The flow battery of Aspect 16, wherein the ratio of the enclosed volume of the second electrode region and the enclosed volume of the second fluidic train is from about 0.95:1.05 to about 0.90:1.10.

Aspect 18. The flow battery of any one of Aspects 1 to 17, wherein the second electrolyte source has an enclosed volume, wherein the second fluidic train in its second state has an enclosed volume, and wherein the ratio of the enclosed volume of the second fluidic train and the enclosed volume of the second electrolyte source is from about 1:100,000 to about 1:1, e.g., from about 1:100,000 to about 1:1, from about 1:50,000 to about 1:1, from about 1:25,000 to about 1:1, from about 1:15,000 to about 1:1, from about 1:5,000 to about 1:1, from about 1:1,000 to about 1:1, from about 1:500 to about 1:1, from about 1:250 to about 1:1, from about 1:100 to about 1:1, from about 1:50 to about 1:1, from about 1:10 to about 1:1, from about 1:5 to about 1:11.

Figure 10:
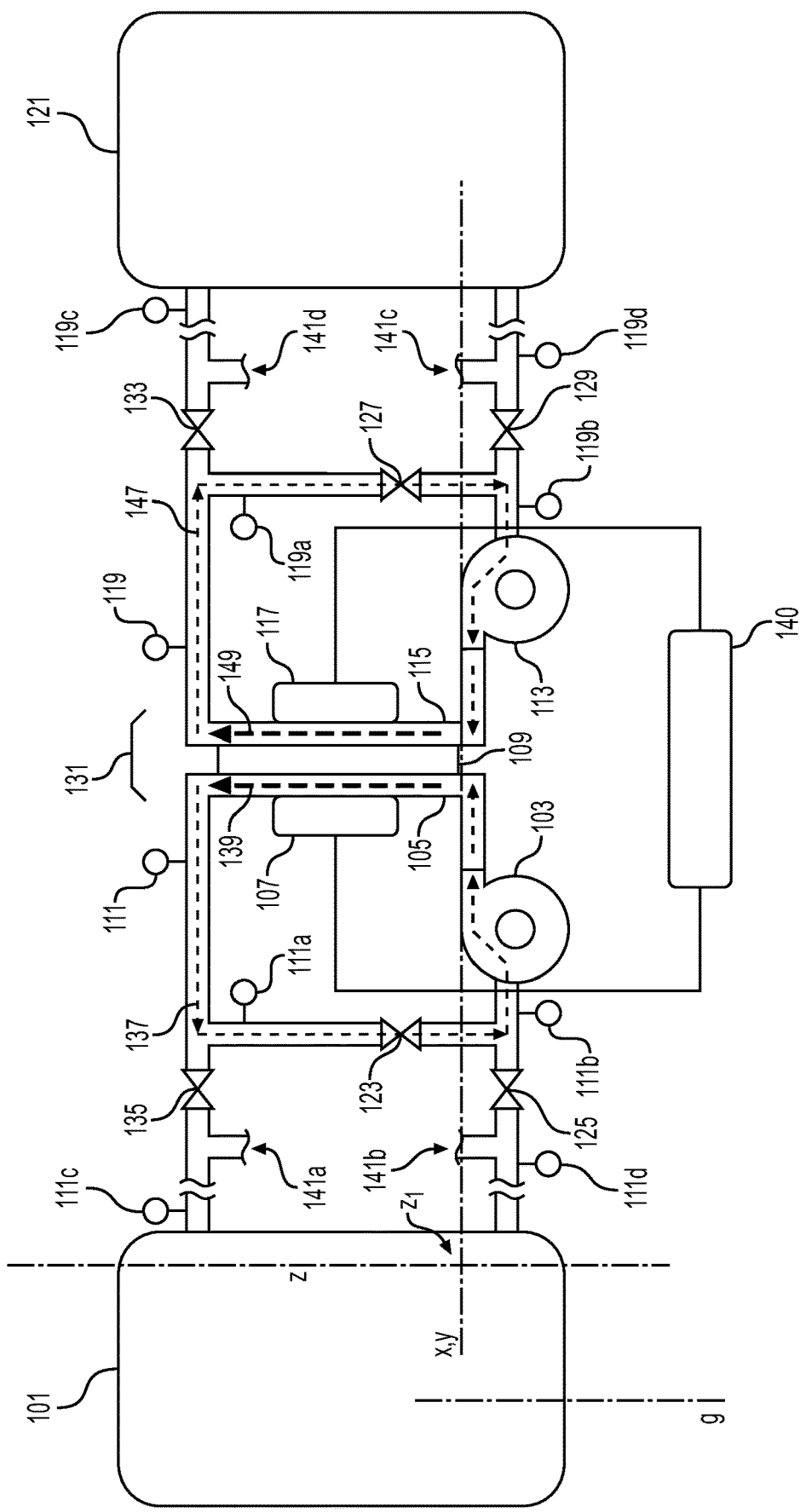
FIG. 10 depicts the flow battery of FIG. 5, defining x, y, and z coordinates.

Aspect 19. The flow battery of any one of Aspects 1-18, wherein a z-direction is defined as parallel to the force of gravity, and wherein an x-y plane, which is perpendicular to the z-direction at a given z-value, intersects the first main electrolyte source and the first electrode region. For example, as shown in FIG. 10, the z-direction is defined as parallel to the force of gravity, g, and an x-y plane, which is perpendicular to the z-direction at a given z-value, intersects the first main electrolyte source and the first electrode region. In particular, as shown in FIG. 10, the x-y plane at a point $z_1$ intersects the first main electrolyte source 101 and the first electrode region 139 at the source of the first electrode region. A person skilled in the art would appreciate that an x-y plane, which is perpendicular to the z-direction at a given z-value, may intersect any or all of the main electrolyte sources and any or all of the electrode regions of the flow battery.

Aspect 20. The flow battery of any one of Aspects 1 to 19, wherein the first fluidic train comprises either a pump or a pneumatic system configured to clear first electrolyte from the first electrode region.

Aspect 21. The flow battery of claim 20, wherein the pump or pneumatic system is configured to clear first electrolyte from the first electrode region when the first fluidic train is in its second state.

Aspect 22. The flow battery of any one of Aspects 1 to 21, wherein the second fluidic train comprises either a pump or a pneumatic system configured to clear second electrolyte from the second electrode region.

Aspect 23. The flow battery of Aspect 22, wherein the pump or pneumatic system is configured to clear second electrolyte from the second electrode region when the second fluidic train is in its second state.

Aspect 24. The flow battery of any one of Aspects 1 to 23, wherein the flow battery is configured to effect an action in response to a determined characteristic of first electrolyte that is in fluid communication with the first electrode region while the first fluidic train is in its second state. For example, the redox flow battery can be configured to effect an action in response to one or more of a detected pressure, conductivity, color, temperature, turbidity, viscosity, ground-reference potential, density, concentration, water activity, reduction potential, state of charge, and pH. Such actions can include, without limitation, adding first electrolyte, removing first electrolyte, increasing a state of charge and/or pH of the first electrolyte, or even decreasing a state of charge and/or pH of first electrolyte.

Aspect 25. The flow battery of any one of Aspects 1 to 24, wherein the flow battery is configured to effect an action in response to a determined characteristic of second electrolyte that is in fluid communication with the second electrode region while the second fluidic train is in its second state. For example, the redox flow battery can be configured to effect an action in response to one or more of a detected pressure, conductivity, color, temperature, turbidity, viscosity, ground-reference potential, density, concentration, water activity, reduction potential, state of charge, and pH. Such actions can include, without limitation, adding second electrolyte, removing second electrolyte, increasing a state of charge and/or pH of the second electrolyte, or even decreasing a state of charge and/or pH of second electrolyte.

Aspect 26. The flow battery of any one of Aspects 1 to 25, wherein the first fluidic network further comprises flow structures selected from series subflow structures, parallel subflow structures, shunt current control subflow structures (such as for shunt current mitigation and/or management), counterflow subflow structures, measurement and other diagnostic subflow structures, treatment (such as electrolyte rebalancing) subflow structures, source subflow structures, drain subflow structures, and combinations thereof.

Aspect 27. The flow battery of any one of Aspects 4 to 26, wherein the second fluidic network further comprises flow structures selected from series subflow structures, parallel subflow structures, shunt current control subflow structures (such as for shunt current mitigation and/or management), counterflow subflow structures, measurement and other diagnostic subflow structures, treatment (such as electrolyte rebalancing) subflow structures, source subflow structures, drain subflow structures, and combinations thereof.

Aspect 28. The flow battery of any one of Aspects 1 to 27, wherein the first dynamic fluidic network further comprises flow structures selected from series subflow structures, parallel subflow structures, shunt current control subflow structures (such as for shunt current mitigation and/or management), counterflow subflow structures, measurement subflow structures, diagnostic subflow structures, treatment (such as electrolyte rebalancing) subflow structures, source subflow structures, reticulated subflow structures, drain subflow structures, and combinations thereof.

Aspect 29. The flow battery of any one of Aspects 4 to 27, wherein the second dynamic fluidic network further comprises flow structures selected from series subflow structures, parallel subflow structures, shunt current control subflow structures (such as for shunt current mitigation and/or management), counterflow subflow structures, measurement subflow structures, diagnostic subflow structures, treatment (such as electrolyte rebalancing) subflow structures, source subflow structures, reticulated subflow structures, drain subflow structures, and combinations thereof.

Aspect 30. The flow battery of any one of Aspects 1 to 29, wherein the first dynamic fluidic network has at least one region where $V_n$ and $A_n$ values of the subflow structures progressively decrease. For example, as discussed earlier with respect to FIGS. 1 and 12, $V_4 > V_6 > V_{11} > V_{12} > V_{14}$ with the same progression and relationships for the $A_n$ values.

Aspect 31. The flow battery of any one of Aspects 4 to 30, wherein the second dynamic fluidic network has at least one region where $V_n$ and $A_n$ values of the subflow structures progressively decrease.

Aspect 32. The flow battery of any one of Aspects 1 to 31, wherein the first dynamic fluidic network has at least one region where $V_n$ and $A_n$ values of the subflow structures progressively increase.

Aspect 33. The flow battery of any one of Aspects 4 to 32, wherein the second dynamic fluidic network has at least one region where $V_n$ and $A_n$ values of the subflow structures progressively increase.

Aspect 34. The flow battery of any one of Aspects 1 to 33, wherein the first counterflow structure conveys the first electrolyte to a balancing cell and reintroduces treated first electrolyte into the first dynamic fluidic network.

Aspect 35. The flow battery of any one of Aspects 4 to 34, wherein the second counterflow structure conveys the second electrolyte to a balancing cell and reintroduces treated second electrolyte into the second dynamic fluidic network.

Aspect 36. The flow battery of any one of Aspects 1 to 35, wherein the first dynamic fluidic network further comprises a BPPA and/or an MPPA, each comprising a frame element, an inner plate, and at least:
(a) five different flow structures on each side of a BPPA or the one side of an MPPA, or
(b) six different flow structures on each side of a BPPA or the one side of an MPPA, or
(c) a combination of (a) and (b). For example, one side of a BPPA has five different flow structures and the other side has six different flow structures.

Aspect 37. The flow battery of Aspect 36, wherein the at least six different flow structures comprise an inlet conduit, an inlet manifold, inlet flow structures, outlet flow structures, an outlet manifold, and an outlet conduit.

Aspect 38. The flow battery of any one of Aspects 4 to 37, wherein the second dynamic fluidic network further comprises a BPPA and/or an MPPA, each comprising a frame element and an inner plate having characteristics recited in Aspects 36 and 37.

Aspect 39. The flow battery of Aspect 38 wherein the at least six different flow structures comprise an inlet conduit, an inlet manifold, inlet flow structures, outlet flow structures, an outlet manifold, and an outlet conduit Aspect 40. The flow battery of either Aspect 37 or Aspect 39 wherein an inlet manifold and/or an outlet manifold is elongated, and optionally, has an s-curve configuration.

Aspect 41. The flow battery of any one of Aspects 36 to 40, wherein each manifold n has values for a volume $V_n$, a cross-sectional area $A_n$, a length $L_n$, and a path $P_n$, such that $V_n$, $A_n$, $L_n$, and $P_n$ define a shape of the manifold, and wherein one or more of $V_n$, $A_n$, $L_n$, and $P_n$ values may be the same or different between inlet and outlet manifolds on the same side of the BPPA or MPPA.

Aspect 42. The flow battery of any one of Aspects 36 to 41 wherein:
(a) at least one of the inlet conduit, inlet manifold, outlet manifold, and outlet conduit comprises a shunt current control subflow structure; or
(b) at least two inlet flow structures and/or at least two outlet flow structures are structurally and fluidically interconnected within an inner plate; or
(c) at least one inlet flow structure and at least one outlet flow structure and structurally and fluidically interconnected within an inner plate; or
(d) none of the inlet flow structures are structurally interconnected with each other within an inner plate and/or none of the outlet flow structures are structurally interconnected with each other within an inner plate; or
(e) the frame element forms a complete, continuous, unitary perimeter around the inner plate; or
(f) inner plate flow structures are interconnected, restricted, or terminated within the frame element; or
(g) the inner plate comprises a conductive material; or (h) the frame element comprises a non-conductive material; or
(i) a combination of any two or more of (a) through (h).

Aspect 43. The flow battery of any one of Aspects 36 to 42, wherein each inner plate flow structure n has values for a volume $V_n$, a cross-sectional area $A_n$, a length $L_n$, and a path $P_n$, such that $V_n$, $A_n$, $L_n$, and $P_n$ define a shape of the flow structure and wherein one or more of $V_n$, $A_n$, $L_n$, and $P_n$ values may be the same or different between inlet and outlet flow structures on the same side of the BPPA or MPPA.

Aspect 44. The flow battery of Aspect 40, wherein each flow channel n has values for a volume $V_n$, a cross-sectional area $A_n$, a length $L_n$, and a path $P_n$, such that $V_n$, $A_n$, $L_n$, and $P_n$ define a shape of the flow channel and wherein one or more of $V_n$, $A_n$, $L_n$, and $P_n$ values may be the same or different between inlet and outlet flow channels on different sides of the BPPA.

Aspect 45. The flow battery of any one of Aspects 40 to 44, wherein the inner plate of each side of the BPPA and the MPPA comprises a first inlet flow structure, a second inlet flow structure, a third inlet flow structure, and a fourth inlet flow structure, etc., which may be the same or different from each other in terms of $V_n$, $A_n$, $L_n$, and $P_n$ values, and a first outlet flow structure, a second outlet flow structure, a third outlet flow structure, and a fourth outlet flow structure, etc., which may be the same or different from each other in terms of $V_n$, $A_n$, $L_n$, and $P_n$ values.

Aspect 46. The flow battery of any one of Aspects 36 to 45, wherein the at least six different flow structures on a side of a BPPA or MPPA comprise a first subflow structure and a second subflow structure wherein the flow structures of each subflow structure are structurally and fluidically connected in series.

Aspect 47. The flow battery of any one of Aspects 40 to 46, wherein the inner plates of each side of a BPPA may have the same or different patterns or configurations of inlet and/or outlet flow structures. Similarly, the inner plates of MPPAs with opposite polarity may have the same or different patterns or configurations of inlet and/or outlet flow structures.

Aspect 48. The flow battery of Aspect 46, wherein each of the first subflow structure and the second subflow structure is an integral, unitary subflow structure and collectively comprise a plate subflow structure.

Aspect 49. The flow battery of any one of Aspects 36 to 48, wherein one or more of the inlet manifolds has holes that communicate fluidically with one or more inlet flow structures. Optionally, the fluidic communication may be accomplished through a plenum.

Aspect 50. The flow battery of any one of Aspects 36 to 49, wherein one or more of the outlet manifolds has holes that communicate fluidically with one or more outlet flow structures. Optionally, the fluidic communication may be accomplished through a plenum.

Aspect 51. A flow battery system comprising at least one flow battery system comprising at least one ancillary system and at least one flow battery of any one of Aspects 1 to 50.

Aspect 52. A flow battery system of Aspect 51, wherein the at least one flow battery system and two or more flow batteries are in series, in parallel, or in series and in parallel. When flow batteries of the present disclosure are in series and/or in parallel, they may have common features. Non-limiting examples include two flow batteries of the present disclosure having a common main electrolyte source for an electrolyte or a common dynamic fluidic network for the electrolyte.

Aspect 53. A method, comprising: with a flow battery according to any one of Aspects 1 to 50, placing the first fluidic train into its second state and determining a characteristic of first electrolyte disposed within the first sampling segment when the first fluidic train is in its second state.

Aspect 54. A method of Aspect 53, further comprising placing the second fluidic train into its second state and determining a characteristic of second electrolyte disposed within the second sampling segment when the second fluidic train is in its second state.

Aspect 55. A method, comprising: with a flow battery according to any one of Aspects 4 to 50, placing the second fluidic train into its second state and determining a characteristic of second electrolyte disposed within the second sampling segment when the second fluidic train is in its second state.

Aspect 56. The method of any one of Aspects 53 to 55, wherein the characteristic of first electrolyte and/or second electrolyte is selected from pressure, conductivity, color, temperature, turbidity, viscosity, ground-reference potential, density, concentration, water activity, oxidation-reduction potential, pH, state of charge, and combinations thereof.

Aspect 57. A method comprising: with a flow battery having a first half and a second half, the first half comprising a first main electrolyte source, a first electrolyte, and a first dynamic fluidic network comprising a first counterflow structure, a first electrode region and a first fluidic train that is convertible between a first state and a second state and has a first sampling segment, converting the first fluidic train from its first state, with the first main electrolyte source and the first dynamic fluidic network, outside the first fluidic train and first electrode region, in fluid communication with the first electrode region, to its second state, with the first main electrolyte source and the first dynamic fluidic network, outside the first fluidic train and first electrode region, in fluid isolation from the first electrode region; and while the first fluidic train is in its second state, determining a characteristic of first electrolyte that is in fluid communication with the first electrode region.

Alternatively, in lieu of the first counterflow structure, the first dynamic fluidic network may have flow structures selected from series subflow structures, parallel subflow structures, shunt current control subflow structures (such as for shunt current mitigation and/or management), measurement subflow structures, diagnostic subflow structures, treatment (such as electrolyte rebalancing) subflow structures, source subflow structures, reticulated subflow structures, drain subflow structures, and combinations thereof.

Aspect 58. A method of Aspect 57, further comprising with the second half comprising a second main electrolyte source, a second electrolyte, and a second dynamic fluidic network comprising a second counterflow structure, a second electrode region, and a second fluidic train that is convertible between a first state and a second state and has a second sampling segment, converting the second fluidic train from its first state, with the second main electrolyte source and the second dynamic fluidic network, outside the second fluidic train and second electrode region, in fluid communication with the second electrode region, to its second state, with the second main electrolyte source and the second dynamic fluidic network, outside the second fluidic train and second electrode region, in fluid isolation from the second electrode region; and while the second fluidic train is in its second state, determining a characteristic of second electrolyte that is in fluid communication with the second electrode region.

Alternatively, in lieu of the second counterflow structure, the second dynamic fluidic network may have flow structures selected from series subflow structures, parallel subflow structures, shunt current control subflow structures (such as for shunt current mitigation and/or management), measurement subflow structures, diagnostic subflow structures, treatment (such as electrolyte rebalancing) subflow structures, source subflow structures, reticulated subflow structures, drain subflow structures, and combinations thereof.

Aspect 59. A method comprising: with a flow battery having a first half and a second half, the second half comprising a second main electrolyte source, a second electrolyte, and a second dynamic fluidic network comprising a second counterflow structure, a second electrode region and a second fluidic train that is convertible between a first state and a second state and has a second sampling segment, converting the second fluidic train from its first state, with the second main electrolyte source and the second dynamic fluidic network, outside the second fluidic train and second electrode region, in fluid communication with the second electrode region, to its second state, with the second main electrolyte source and the second dynamic fluidic network, outside the second fluidic train and second electrode region, in fluid isolation from the second electrode region; and while the second fluidic train is in its second state, determining a characteristic of second electrolyte that is in fluid communication with the second electrode region.

Alternatively, in lieu of the second counterflow structure, the second dynamic fluidic network may have flow structures selected from series subflow structures, parallel subflow structures, shunt current control subflow structures (such as for shunt current mitigation and/or management), measurement subflow structures, diagnostic subflow structures, treatment (such as electrolyte rebalancing) subflow structures, source subflow structures, reticulated subflow structures, drain subflow structures, and combinations thereof.

Aspect 60. The method of any one of Aspects 57 to 59, wherein the determined characteristic of first electrolyte and/or second electrolyte is selected from pressure, conductivity, color, temperature, turbidity, viscosity, ground-reference potential, density, concentration, water activity, oxidation-reduction potential, pH, state of charge, and combinations thereof.

Aspect 61. The method of any one of Aspects 57 to 60, further comprising effecting an action in response to the determined characteristic of first electrolyte that is in fluid communication with the first electrode region while the first fluidic train is in its second state. The method can include, without limitation, adding first electrolyte, removing first electrolyte, increasing a state of charge of the first electrolyte, or even to decreasing a state of charge of first electrolyte, and other aspects of electrolyte balancing.

Aspect 62. The method of any one of Aspects 58 to 61, further comprising effecting an action in response to the determined characteristic of second electrolyte that is in fluid communication with the second electrode region while the second fluidic train is in its second state. The method can include, without limitation, adding second electrolyte, removing second electrolyte, increasing a state of charge of the second electrolyte, or even to decreasing a state of charge of second electrolyte, and other aspects of electrolyte balancing.

Aspect 63. The method of any one of Aspects 57 to 62, further comprising converting the first fluidic train from its second state to its first state.

Aspect 64. The method of any one of Aspects 57 to 63, wherein the method is performed in an automated fashion.

Aspect 65. The method of any one of Aspects 57 to 64, wherein the method is performed manually.

Aspect 66. The method of any one of Aspects 57 to 65, further comprising assessing a level of crossover between the first main electrolyte source and another main electrolyte source while the first fluidic train is in its second state.

Aspect 67. The method of any one of Aspects 58 to 66, further comprising converting the second fluidic train from its second state to its first state.

Aspect 68. The method of any one of Aspects 58 to 67, wherein the method is performed in an automated fashion.

Aspect 69. The method of any one of Aspects 58 to 68, wherein the method is performed manually.

Aspect 70. The method of any one of Aspects 58 to 69, further comprising assessing a level of crossover between the second main electrolyte source and another main electrolyte source while the second fluidic train is in its second state.

Aspect 71. The method of any one of Aspects 53 to 70 wherein a flow battery comprises a BPPA or MPPA in an electrode region, the BPPA or MPPA comprising a frame element, an inner plate, and each side of a BPPA or the side of an MPPA comprises at least six different flow channels.

Aspect 72. A flow battery comprising: a dynamic fluidic network system comprising a first dynamic fluidic network and second fluidic network; wherein the flow battery has a first half and a second half, the first half comprising (i) a first main electrolyte source configured to contain a first electrolyte, (ii) a first electrode region configured for electronic communication with the first electrolyte, and (iii) the first dynamic fluidic network configured for fluid communication with the first main electrolyte source and comprising the first electrode region, a first diagnostic subflow structure, and a first treatment subflow structure, and the second half comprising (i) a second main electrolyte source configured to contain a second electrolyte, (ii), a second electrode region configured for electronic communication with the second electrolyte, and (iii) the second fluidic network configured for fluid communication with the second main electrolyte source and comprising the second electrode region and a second diagnostic subflow structure, and a second treatment subflow structure.

Aspect 73. The flow battery of Aspect 72, wherein the first diagnostic subflow structure comprises (i) one or more instruments configured to determine a characteristic of first electrolyte disposed within the first diagnostic subflow structure, (ii) one or more instruments configured to determine a characteristic of first electrolyte that is not disposed within the first diagnostic subflow structure, or both (i) and (ii).

Aspect 74. The flow battery of any one of Aspects 72 to 73, wherein the second diagnostic subflow structure comprises (i) one or more instruments configured to determine a characteristic of second electrolyte disposed within the second diagnostic subflow structure, (ii) one or more instruments configured to determine a characteristic of second electrolyte that is not disposed within the second diagnostic subflow structure, or both (i) and (ii).

Aspect 75. The flow battery of Aspect 73, wherein the characteristic of first electrolyte is selected from pressure, conductivity, color, temperature, turbidity, viscosity, ground-reference potential, density, concentration, water activity, oxidation-reduction potential, pH, state of charge, and combinations thereof.

Aspect 76. The flow battery of Aspect 73, wherein the first diagnostic subflow structure comprises both (i) and (ii) and the characteristic determined by (i) is the same as the characteristic determined by (ii).

Aspect 77. The flow battery of Aspect 74, wherein the characteristic of second electrolyte is selected from pressure, conductivity, color, temperature, turbidity, viscosity, ground-reference potential, density, concentration, water activity, oxidation-reduction potential, pH, state of charge, and combinations thereof.

Aspect 78. The flow battery of Aspect 74, wherein the second diagnostic subflow structure comprises both (i) and (ii) and the characteristic determined by (i) is the same as the characteristic determined by (ii).

Aspect 79. The flow battery of any one of Aspects 72 to 78, further comprising a first pump or pneumatic system configured to clear first electrolyte from the first diagnostic subflow structure and/or the first treatment subflow structure.

Aspect 80. The flow battery of any one of Aspects 72 to 79, further comprising a second pump or pneumatic system configured to clear second electrolyte from the second diagnostic subflow structure and/or the second treatment subflow structure.

Aspect 81. The flow battery of any one of Aspects 72 to 80, wherein the flow battery is configured to effect an action by the first treatment subflow structure in response to a determined characteristic of first electrolyte that is in fluid communication with the first diagnostic subflow structure.

Aspect 82. The flow battery of any one of Aspects 72 to 81, wherein the flow battery is configured to effect an action by the second treatment subflow structure in response to a determined characteristic of second electrolyte that is in fluid communication with the second diagnostic subflow structure.

Aspect 83. The flow battery of any one of Aspects 72 to 82, wherein the first dynamic fluidic network further comprises flow structures selected from series subflow structures, parallel subflow structures, shunt current control subflow structures (such as for shunt current mitigation and/or management), counterflow subflow structures, measurement subflow structures, diagnostic subflow structures, treatment subflow structures, source subflow structures, reticulated subflow structures, drain subflow structures, and combinations thereof.

Aspect 84. The flow battery of any one of Aspects 72 to 83, wherein the first dynamic fluidic network further comprises a BPPA or an MPPA, comprising said first diagnostic subflow structure and said first treatment subflow structure Aspect 85. The flow battery of Aspect 84, wherein the BPPA or the MPPA further comprises an inlet conduit, an inlet manifold, a flow plate, an outlet manifold, and an outlet conduit.

Aspect 86. The flow battery of Aspect 85, wherein the inlet manifold and/or the outlet manifold has an s-curve configuration.

Aspect 87. The flow battery of any one of Aspects 72 to 86, wherein the second fluidic network is a dynamic fluidic network.

Aspect 88. The flow battery of Aspect 87, wherein the second dynamic fluidic network further comprises flow structures selected from series subflow structures, parallel subflow structures, shunt current control subflow structures (such as for shunt current mitigation and/or management), counterflow subflow structures, measurement subflow structures, diagnostic subflow structures, treatment subflow structures, source subflow structures, reticulated subflow structures, drain subflow structures, and combinations thereof.

Aspect 89. The flow battery of Aspect 88, wherein the second dynamic fluidic network further comprises a BPPA or an MPPA, comprising said second diagnostic subflow structure and said second treatment subflow structure.

Aspect 90. The flow battery of Aspect 89, wherein the BPPA or the MPPA further comprises an inlet conduit, an inlet manifold, a flow plate, an outlet manifold, and an outlet conduit.

Aspect 91. The flow battery of Aspect 90, wherein the inlet manifold and/or the outlet manifold has an s-curve configuration.

Aspect 92. The flow battery of any one of Aspects 72 to 91, wherein one or more of the first diagnostic subflow structure, the first treatment subflow structure, the second diagnostic subflow structure, the second treatment subflow structure is an isolated subflow structure.

Aspect 93. A flow battery comprising: a dynamic fluidic network system comprising a first dynamic fluidic network, the first dynamic fluidic network comprising an inner plate flow structure comprising a first shunt current control subflow structure. The first dynamic fluidic network may comprise two or more inner plate flow structures. Each inner flow plate structures may comprise one or more shunt current control subflow structures.

Aspect 94. The flow battery of Aspect 93, wherein the first shunt current control subflow structure is a component of a first shunt current control system. A first shunt current control system may comprise one or more first shunt current control subflow structures, one or more first shunt current mitigation subflow structures, and/or one or more first shunt current management subflow structures.

Aspect 95. The flow battery of Aspect 94, wherein the first shunt current control system further comprises an inlet manifold, an outlet manifold, or both inlet and outlet manifolds.

Aspect 96. The flow battery of Aspect 95, wherein the first shunt current control system further comprises a first balancing cell.

Aspect 97. The flow battery of Aspect 93, wherein the dynamic fluidic network system further comprises a second fluidic network.

Aspect 98. The flow battery of Aspect 97, wherein the second fluidic network is a dynamic fluidic network.

Aspect 99. The flow battery of Aspect 98, wherein the second dynamic fluidic network comprising an inner plate flow structure comprising a second shunt current control subflow structure, which is a component of a second shunt current control system. The second dynamic fluidic network may comprise two or more inner plate flow structures. Each inner flow plate structures may comprise one or more shunt current control subflow structures. A second shunt current control system may comprise one or more second shunt current control subflow structures, one or more second shunt current mitigation subflow structures, and/or one or more second shunt current management subflow structures.

Aspect 100. The flow battery of Aspect 99, wherein the second shunt current control system further comprises an inlet manifold, an outlet manifold, or both inlet and outlet manifolds.

Aspect 101. The flow battery of Aspect 100, wherein second first shunt current control system further comprises a second balancing cell.

Aspect 102. A flow battery comprising a dynamic fluidic network system comprising a first dynamic fluidic network, the first dynamic fluidic network comprising a first counterflow structure.

Aspect 103. The flow battery of Aspect 102, wherein the first counterflow structure comprises an instrument selected from monitors, sensors, and processors configured to determine a characteristic of a first electrolyte disposed within the first counterflow structure.

Aspect 104. The flow battery of Aspect 103, wherein the characteristic of the first electrolyte is selected from pressure, conductivity, color, temperature, turbidity, viscosity, ground-reference potential, density, concentration, water activity, oxidation-reduction potential, pH, state of charge, and combinations thereof.

Aspect 105. The flow battery of Aspect 102, wherein the dynamic fluidic network system further comprises a second fluidic network.

Aspect 106. The flow battery of Aspect 105, wherein the second fluidic network is a dynamic fluidic network.

Aspect 107. The flow battery of Aspect 105, wherein the second dynamic fluidic network comprising a second counterflow structure.

Aspect 108. The flow battery of Aspect 107, wherein the second counterflow structure comprises an instrument selected from monitors, sensors, and processors configured to determine a characteristic of a second electrolyte disposed within the second counterflow structure.

Aspect 109. The flow battery of Aspect 108, wherein the characteristic of the second electrolyte is selected from pressure, conductivity, color, temperature, turbidity, viscosity, ground-reference potential, density, concentration, water activity, oxidation-reduction potential, pH, state of charge, and combinations thereof.

Aspect 110. The flow battery of any one of Aspects 102 to 109, wherein the first counterflow structure comprises a balancing cell.

Aspect 111. The flow battery of any one of Aspects 107 to 109, wherein the second counterflow structure comprises a balancing cell.

Aspect 112. The flow battery of any one of Aspects 102 to 111, wherein the first counterflow structure is configured such that a flow of electrolyte through the first counterflow structure is counter to a flow of electrolyte from a first main electrolyte source to a first electrode region to the first main electrolyte source.

Aspect 113. The flow battery of any one of Aspects 102 to 111, wherein the first counterflow structure is configured such that the flow of electrolyte through the first counterflow structure is concurrent to a flow of electrolyte from a first main electrolyte source to a first electrode region to the first main electrolyte source.

Aspect 114. The flow battery of any one of Aspects 102 to 111, wherein the first counterflow structure is configured to operate alternatively in two states: (i) wherein a flow of electrolyte through the first counterflow structure is counter to a flow of electrolyte from a first main electrolyte source to a first electrode region to the first main electrolyte source, and (ii) wherein a flow of electrolyte through the first counterflow structure is concurrent to a flow of electrolyte from a first main electrolyte source to a first electrode region to the first main electrolyte source.

Aspect 115. The flow battery of any one of Aspects 107 to 114, wherein the second counterflow structure is configured such that a flow of electrolyte through the second counterflow structure is counter to a flow of electrolyte from a second main electrolyte source to a second electrode region to the second main electrolyte source.

Aspect 116. The flow battery of any one of Aspects 107 to 111, wherein the second counterflow structure is configured such that the flow of electrolyte through the second counterflow structure is concurrent to a flow of electrolyte from a second main electrolyte source to a second electrode region to the second main electrolyte source.

Aspect 117. The flow battery of any one of Aspects 107 to 111, wherein the second counterflow structure is configured to operate alternatively in two states: (i) wherein a flow of electrolyte through the second counterflow structure is counter to a flow of electrolyte from a second main electrolyte source to a second electrode region to the second main electrolyte source, and (ii) wherein a flow of electrolyte through the second counterflow structure is concurrent to a flow of electrolyte from a second main electrolyte source to a second electrode region to the second main electrolyte source.

Aspect 118. The flow battery of any one of Aspects 102 to 117, wherein the first counterflow structure is in fluid communication with a portion of the first dynamic fluidic network when the portion of the first dynamic fluidic network is in fluid isolation from the remainder of the first dynamic fluidic network.

Aspect 119. The flow battery of Aspect 118, wherein the first counterflow structure is configured to reintroduce electrolyte from the first counterflow structure to the remainder of the first dynamic fluidic network after treatment of the electrolyte with a first balancing cell.

Aspect 120. The flow battery of any one of Aspects 107 to 117, wherein the second counterflow structure is in fluid communication with a portion of the second dynamic fluidic network when the portion of the second dynamic fluidic network is in fluid isolation from the remainder of the second dynamic fluidic network.

Aspect 121. The flow battery of Aspect 120, wherein the second counterflow structure is configured to reintroduce electrolyte from the second counterflow structure to the remainder of the second dynamic fluidic network after treatment of the electrolyte with a second balancing cell.

Aspect 122. The flow battery of any one of Aspects 102 to 121, wherein the first counterflow structure further comprises a first pump.

Aspect 123. The flow battery of any one of Aspects 102 to 122, wherein the first dynamic fluidic network further comprises one or more flow structures selected from series subflow structures, parallel subflow structures, shunt current control subflow structures, counterflow subflow structures, measurement subflow structures, diagnostic subflow structures, treatment subflow structures, source subflow structures, reticulated subflow structures, drain subflow structures, and combinations thereof.

Aspect 124. The flow battery of any one of Aspects 107 to 123, wherein the second counterflow structure further comprises a second pump.

Aspect 125. The flow battery of any one of Aspects 107 to 124, wherein the second dynamic fluidic network further comprises one or more flow structures selected from series subflow structures, parallel subflow structures, shunt current control subflow structures, counterflow subflow structures, measurement subflow structures, diagnostic subflow structures, treatment subflow structures, source subflow structures, reticulated subflow structures, drain subflow structures, and combinations thereof.

Aspect 126. A flow battery system comprising a stack of one or more flow batteries of any one of Aspects 1 to 71 and 93-125. A flow battery system may comprise a stack of two or more flow batteries.

Aspect 127. The flow battery system Aspect 126, further comprising a diagnostic subflow structure, a treatment subflow structure, performance controls, control hardware and software, and a power conditioning unit.

Having now described some aspects of the disclosure, it should be apparent to those skilled in the art that the foregoing is merely illustrative and not limiting, having been presented by way of example only. Numerous modifications and other aspects are within the scope of one of ordinary skill in the art and are contemplated as falling within the scope of the present disclosure. In particular, although many of the examples presented herein involve specific combinations of method acts or system elements, it should be understood that those acts and those elements may be combined in other ways to accomplish the same or similar objectives.

What is claimed is:

1. A flow battery comprising:
   a dynamic fluidic network system comprising a first dynamic fluidic network and second fluidic network,
   wherein the flow battery has a first half and a second half,
   the first half comprising (i) a first main electrolyte source configured to contain a first electrolyte, and
   the second half comprising (i) a second main electrolyte source configured to contain a second electrolyte,
   wherein at least one of the first half and the second half comprises a single main electrolyte source.

2. The flow battery of claim 1, wherein,
   the first half further comprising (ii) a first electrode region configured for electronic communication with the first electrolyte, and (iii) the first dynamic fluidic network configured for fluid communication with the first main electrolyte source and comprising the first electrode region, a first diagnostic subflow structure, and a first treatment subflow structure, and
   the second half further comprising (ii), a second electrode region configured for electronic communication with the second electrolyte, and (iii) the second fluidic network configured for fluid communication with the second main electrolyte source and comprising the second electrode region and a second diagnostic subflow structure, and a second treatment subflow structure.

3. The flow battery of claim 2, wherein the first diagnostic subflow structure comprises (i) one or more instruments configured to determine a characteristic of first electrolyte disposed within the first diagnostic subflow structure, (ii) one or more instruments configured to determine a characteristic of first electrolyte that is not disposed within the first diagnostic subflow structure, or both (i) and (ii).

4. The flow battery of claim 3, wherein the characteristic of the first electrolyte is selected from pressure, conductivity, color, temperature, turbidity, viscosity, ground-reference potential, density, concentration, water activity, oxidation-reduction potential, pH, state of charge, and combinations thereof.

5. The flow battery of claim 3, wherein the first diagnostic subflow structure comprises both (i) and (ii) and the characteristic determined by (i) is the same as the characteristic determined by (ii).

6. The flow battery of claim 2, further comprising a first pump or pneumatic system configured to clear first electrolyte from the first diagnostic subflow structure and/or the first treatment subflow structure.

7. The flow battery of claim 2, wherein the flow battery is configured to effect an action by the first treatment subflow structure in response to a determined characteristic of first electrolyte that is in fluid communication with the first diagnostic subflow structure.

8. The flow battery of claim 2, wherein the first dynamic fluidic network further comprises flow structures selected from series subflow structures, parallel subflow structures, shunt current control subflow structures, counterflow subflow structures, measurement subflow structures, diagnostic subflow structures, treatment subflow structures, source subflow structures, reticulated subflow structures, drain subflow structures, and combinations thereof.

9. The flow battery of claim 2, wherein the first dynamic fluidic network further comprises a BPPA or an MPPA, comprising the first diagnostic subflow structure and the first treatment subflow structure.

10. The flow battery of claim 9, wherein the BPPA or the MPPA further comprises an inlet conduit, an inlet manifold, a flow plate, an outlet manifold, and an outlet conduit.

11. The flow battery of claim 10, wherein the inlet manifold and/or the outlet manifold has an s-curve configuration.

12. The flow battery of claim 2, wherein the second fluidic network is a dynamic fluidic network.

13. The flow battery of claim 2, where the first diagnostic subflow structure and/or the first treatment subflow structure is an isolated subflow structure.

14. A flow battery comprising: a dynamic fluidic network system comprising a first dynamic fluidic network, the first dynamic fluidic network comprising a single first main electrolyte source and an inner plate flow structure comprising a first shunt current control subflow structure.

15. The flow battery of claim 14, wherein the first shunt current control subflow structure is a component of a first shunt current control system.

16. The flow battery of claim 15, wherein the first shunt current control system further comprises an inlet manifold, an outlet manifold, or both inlet and outlet manifolds.

17. The flow battery of claim 16, wherein the first shunt current control system further comprises a first balancing cell.

18. A flow battery system comprising a stack of two or more flow batteries of claim 14.

19. The flow battery system of claim 18, further comprising a diagnostic subflow structure, a treatment subflow structure, performance controls, control hardware and software, and a power conditioning unit.

20. A flow battery comprising a dynamic fluidic network system comprising a first dynamic fluidic network, the first dynamic fluidic network comprising a first counterflow structure, a first main electrolyte source, and a first fluidic train that is convertible between a first state and a second state,
   wherein, in the first state, the first main electrolyte source is in fluid communication with a first electrode region, and in the second state, the first main electrolyte source is in fluid isolation from the first electrode region.

21. The flow battery of claim 20, wherein the first counterflow structure comprises an instrument selected from monitors, sensors, and processors configured to determine a characteristic of a first electrolyte disposed within the first counterflow structure.

22. The flow battery of claim 20, wherein the first counterflow structure comprises a first balancing cell.

23. The flow battery of claim 20, wherein the first counterflow structure is configured such that a flow of electrolyte through the first counterflow structure is counter to a flow of electrolyte from the first main electrolyte source to the first electrode region to the first main electrolyte source.

24. The flow battery of claim 20, wherein the first counterflow structure is configured such that a flow of electrolyte through the first counterflow structure is concurrent to a flow of electrolyte from the first main electrolyte source to the first electrode region to the first main electrolyte source.

25. The flow battery of claim 20, wherein the first counterflow structure is configured to operate alternatively in two states: (i) wherein a flow of electrolyte through the first counterflow structure is counter to a flow of electrolyte from the first main electrolyte source to the first electrode region to the first main electrolyte source, and (ii) wherein a flow of electrolyte through the first counterflow structure is concurrent to a flow of electrolyte from the first main electrolyte source to the first electrode region to the first main electrolyte source.

26. The flow battery of claim 20, wherein the first counterflow structure is fluid communication with a portion of the first dynamic fluidic network when the portion of the first dynamic fluidic network is in fluid isolation from the remainder of the first dynamic fluidic network.

27. The flow battery of either claim 26, wherein the first counterflow structure is configured to reintroduce electrolyte from the first counterflow structure to the remainder of the first dynamic fluidic network after treatment of the electrolyte with a first balancing cell.

28. The flow battery of claim 20, wherein the first dynamic fluidic network further comprises one or more flow structures selected from series subflow structures, parallel subflow structures, shunt current control subflow structures, measurement subflow structures, diagnostic subflow structures, treatment subflow structures, source subflow structures, reticulated subflow structures, and drain subflow structures.

29. A flow battery system comprising a stack of one or more flow batteries of claim 20.

30. The flow battery system of claim 29, further comprising a diagnostic subflow structure, a treatment subflow structure, performance controls, control hardware and software, and a power conditioning unit.

\* \* \* \* \*